XXXXXXX

United States Patent
Nakamura et al.

(10) Patent No.: US 10,050,716 B2
(45) Date of Patent: Aug. 14, 2018

(54) OPTICAL TRANSMISSION DEVICE AND OPTICAL TRANSMISSION SYSTEM

(71) Applicant: FUJITSU LIMITED, Kawasaki-shi, Kanagawa (JP)

(72) Inventors: Kentaro Nakamura, Machida (JP); Ryosuke Goto, Plano, TX (US)

(73) Assignee: FUJITSU LIMITED, Kawasaki (JP)

( * ) Notice: Subject to any disclaimer, the term of this patent is extended or adjusted under 35 U.S.C. 154(b) by 161 days.

(21) Appl. No.: 15/048,407

(22) Filed: Feb. 19, 2016

(65) Prior Publication Data
US 2016/0261350 A1 Sep. 8, 2016

(30) Foreign Application Priority Data
Mar. 4, 2015 (JP) .................. 2015-042791

(51) Int. Cl.
*H04B 10/00* (2013.01)
*H04B 10/572* (2013.01)
*H04J 14/02* (2006.01)

(52) U.S. Cl.
CPC ........ *H04B 10/572* (2013.01); *H04J 14/0267* (2013.01); *H04J 14/0295* (2013.01)

(58) Field of Classification Search
CPC .. H04B 10/572; H04J 14/0267; H04J 14/0295
USPC ........................................ 398/182, 195, 196
See application file for complete search history.

(56) References Cited

U.S. PATENT DOCUMENTS

| | | | | |
|---|---|---|---|---|
| 8,989,601 | B2* | 3/2015 | Temporiti Milani | G02F 1/0121 398/198 |
| 9,100,137 | B2* | 8/2015 | Vassilieva | H04J 14/0227 |
| 9,319,132 | B2* | 4/2016 | Ishii | H04B 10/07953 |
| 9,577,763 | B2* | 2/2017 | Al Sayeed | H04B 10/564 |
| 2002/0018468 | A1* | 2/2002 | Nishihara | H04J 14/0227 370/389 |
| 2008/0205269 | A1* | 8/2008 | Kitamura | H04L 47/10 370/230.1 |
| 2010/0209106 | A1* | 8/2010 | Sugawara | H04B 10/275 398/59 |
| 2012/0020660 | A1* | 1/2012 | Le Taillandier De Gabory | ........ H04B 10/0775 398/25 |
| 2012/0195602 | A1* | 8/2012 | Nakashima | H04L 7/0337 398/204 |
| 2014/0133849 | A1* | 5/2014 | Ishii | H04B 10/07953 398/26 |
| 2014/0140692 | A1* | 5/2014 | Oda | H04B 10/5057 398/23 |
| 2014/0314415 | A1* | 10/2014 | Vassilieva | H04J 14/0227 398/76 |

(Continued)

FOREIGN PATENT DOCUMENTS

JP 2008-160227 7/2008
JP 2013-207480 10/2013

*Primary Examiner* — Amritbir Sandhu
(74) *Attorney, Agent, or Firm* — Staas & Halsey LLP

(57) ABSTRACT

An optical transmission device includes: a first receiver that receives a first optical signal transmitted by a first sub carrier included in a super channel; a second receiver that receives a second optical signal transmitted by a second sub carrier included in the super channel; and an optical delay device that delays the first optical signal, based on path lengths of respective transmission paths along which the first optical signal and the second optical signal are transmitted.

5 Claims, 14 Drawing Sheets

(56) References Cited

U.S. PATENT DOCUMENTS

| | | | |
|---|---|---|---|
| 2014/0376001 A1* | 12/2014 | Swanson | A61B 5/0066 |
| | | | 356/479 |
| 2015/0131991 A1* | 5/2015 | Hattori | H04J 14/0212 |
| | | | 398/47 |
| 2015/0215688 A1* | 7/2015 | Sambo | H04J 14/0267 |
| | | | 398/48 |
| 2015/0381272 A1* | 12/2015 | Nakamura | H04B 10/0775 |
| | | | 398/16 |
| 2016/0204875 A1* | 7/2016 | Araki | H04B 10/572 |
| | | | 398/34 |
| 2016/0211920 A1* | 7/2016 | Aono | H04J 14/0238 |
| 2016/0261350 A1* | 9/2016 | Nakamura | H04B 10/572 |
| 2017/0373784 A1* | 12/2017 | Irie | H04B 10/572 |

\* cited by examiner

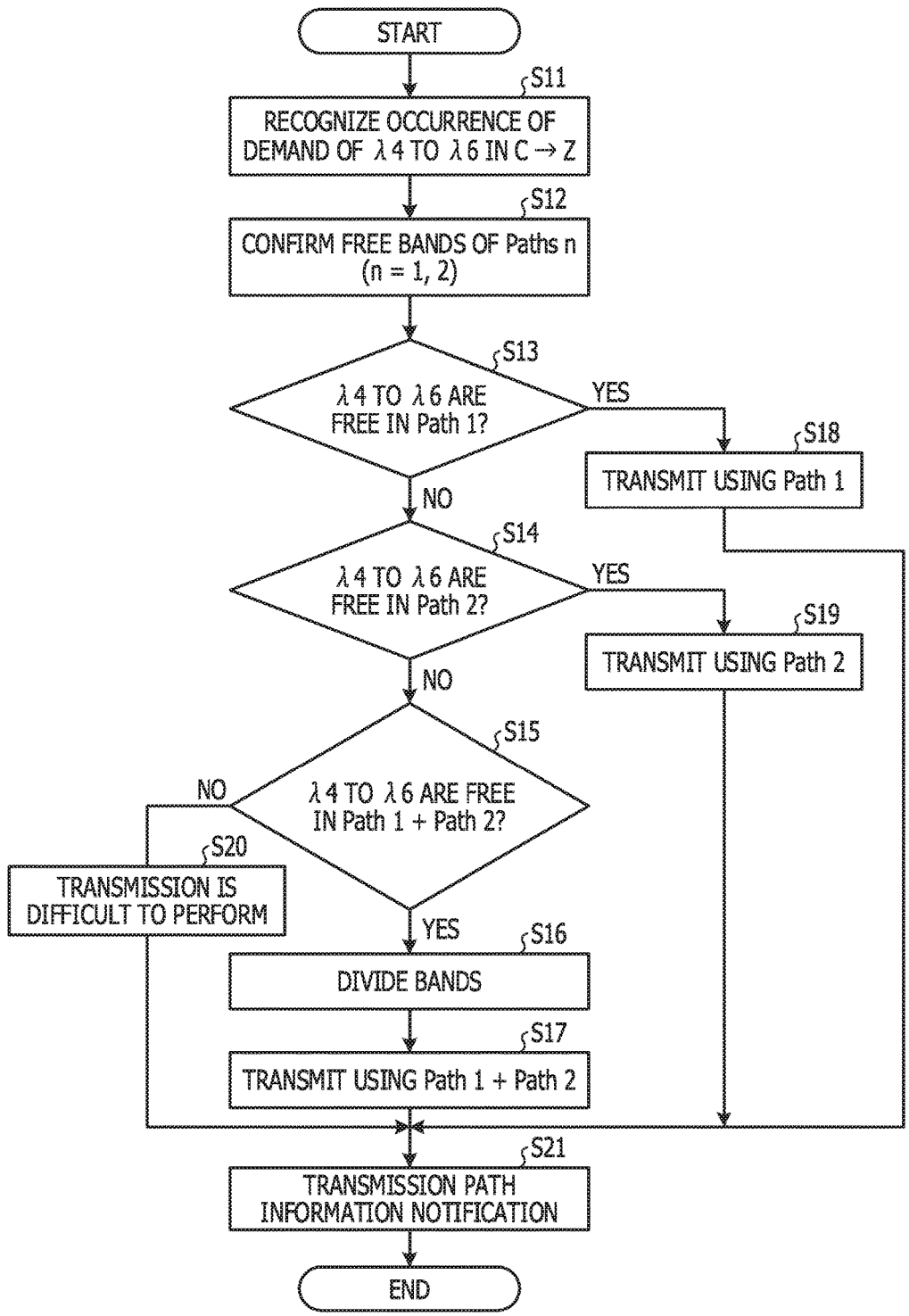

OPTICAL TRANSMISSION DEVICE AND OPTICAL TRANSMISSION SYSTEM

CROSS-REFERENCE TO RELATED APPLICATION

This application is based upon and claims the benefit of priority of the prior Japanese Patent Application No. 2015-042791, filed on Mar. 4, 2015, the entire contents of which are incorporated herein by reference.

FIELD

The embodiments discussed herein are related to an optical transmission device and an optical transmission system.

BACKGROUND

In the past, in optical network communication, there has been a super channel in which transmission is performed with sub carriers as one transmission unit. Since performing transmission by using, for example, 4 sub carriers, the super channel uses bands of 4 wavelengths. In a transmission path in which usage rates of bands are high and available free bands are fewer, it becomes difficult for the super channel to secure bands with an increase in the number of sub carriers. Therefore, there is a technology in which a transmission amount is monitored in an optical transmission device on a transmitting side and transmission performance of the optical transmission device is controlled so as to be boosted in a case where the transmission amount exceeds an allowable load of the optical transmission device.

However, in the above-mentioned technology, there is the following problem. In other words, in, for example, a case of setting a new path of a new super channel or a case of setting a new path for troubleshooting an existing path, it is difficult to secure the number of sub carriers to be used by the super channel in a transmission path in which the new path is to be set. This problem will be described with reference to FIG. 13A and FIG. 13B. FIG. 13A and FIG. 13B are diagrams each illustrating an example of an outline of processing for path setting according to a technology of the related art.

FIG. 13A and FIG. 13B illustrate an example in which it is difficult to secure sub carriers of a new super channel according to a new path in a case of setting the new path of the super channel. As illustrated in FIG. 13A, Path #1 is set as an existing path in a transmission path between a node A and a node Z, and Path #2 is set as an existing path in a transmission path between a node B and the node Z. At this time, Path #3 is to be set as a new path in a transmission path between a node C and the node Z.

However, as illustrated in FIG. 13B, even if Path #3 is intended to be set in the transmission path routed through a section between the node A and the node Z, Path #1 uses a sub carrier of a wavelength λ3. Therefore, it is difficult for Path #3 to use the sub carrier of the wavelength λ3 in the transmission path routed through the section between the node A and the node Z, and as a result, it is difficult to set Path #3 in the transmission path routed through the section between the node A and the node Z. In the same way, even if Path #3 is intended to be set in the transmission path routed through a section between the node B and the node Z, Path #2 uses a sub carrier of a wavelength λ1 and a sub carrier of a wavelength λ2. Therefore, it is difficult for Path #3 to use the sub carrier of the wavelength λ1 and the sub carrier of the wavelength λ2 in the transmission path routed through the section between the node B and the node Z, and as a result, it is difficult to set Path #3 in the transmission path routed through the section between the node B and the node Z. In other words, in the above-mentioned technology, it is difficult to flexibly set a path of the super channel.

The followings are reference documents.
[Document 1] Japanese Laid-open Patent Publication No. 2013-207480 and
[Document 2] Japanese Laid-open Patent Publication No. 2008-160227.

SUMMARY

According to an aspect of the invention, an optical transmission device includes: a first receiver that receives a first optical signal transmitted by a first sub carrier included in a super channel; a second receiver that receives a second optical signal transmitted by a second sub carrier included in the super channel; and an optical delay device that delays the first optical signal, based on path lengths of respective transmission paths along which the first optical signal and the second optical signal are transmitted.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a flowchart illustrating an example of a procedure of processing for a path setting according to the first embodiment;

DESCRIPTION OF EMBODIMENTS

Hereinafter, an optical transmission device and an optical transmission system according to embodiments will be described with reference to accompanying drawings. Note that, in the following descriptions of the embodiments, a redundant description of a same or similar configuration or same or similar processing will be omitted. In addition, the following embodiments do not limit the disclosed technology. The individual embodiments may be arbitrarily combined within a scope in which a content of processing is consistent.

First Embodiment

Configuration of Optical Transmission System According to First Embodiment

Figure 1:
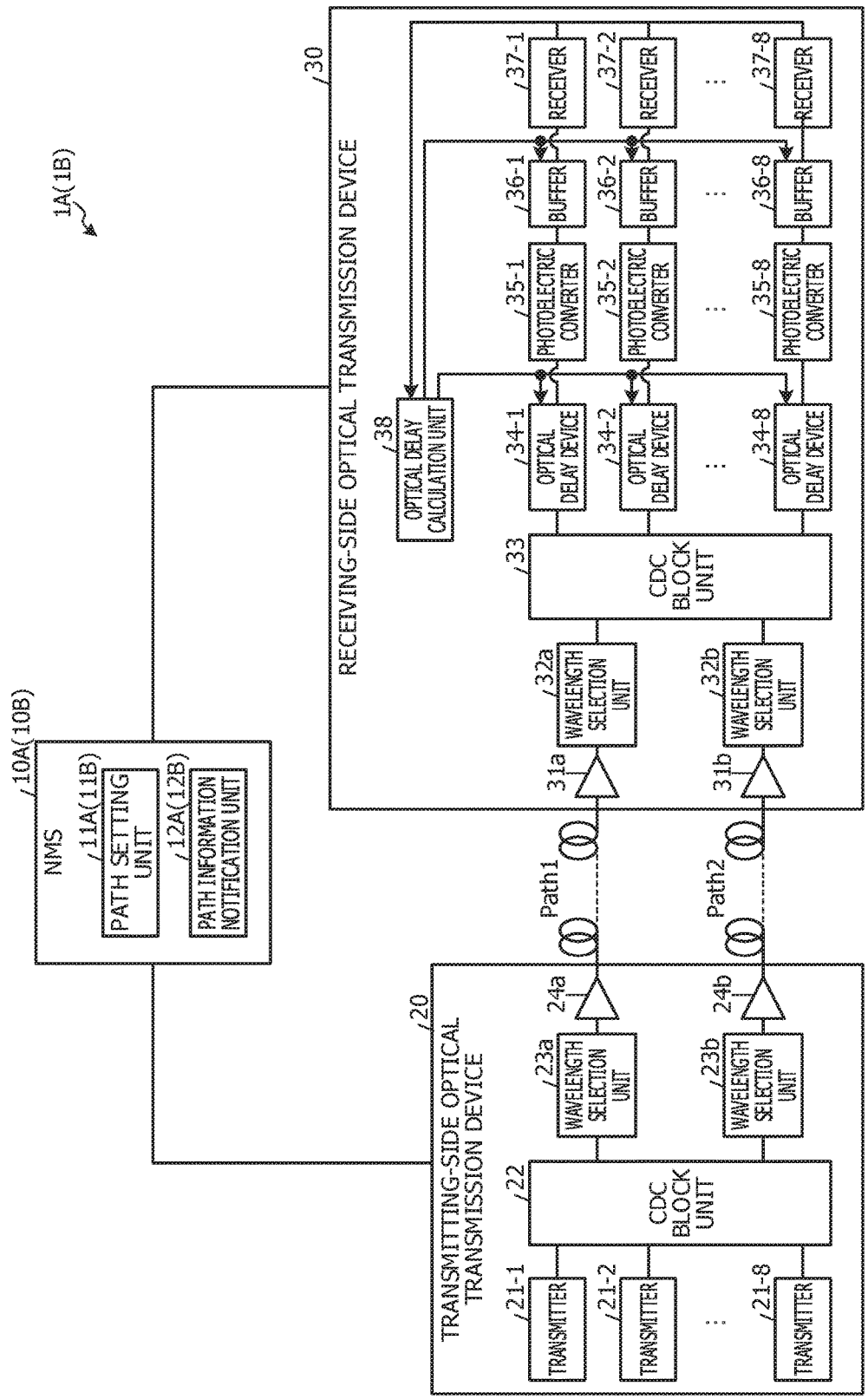
FIG. 1 is a diagram illustrating an example of a configuration of an optical transmission system according to a first embodiment (or a second embodiment)

FIG. 1 is a diagram illustrating an example of a configuration of an optical transmission system according to a first embodiment. An optical transmission system 1A according to the first embodiment includes a network management system (NMS) 10A, a transmitting-side optical transmission device 20, and a receiving-side optical transmission device 30. The transmitting-side optical transmission device 20 and the receiving-side optical transmission device 30 are coupled to each other by Path 1 and Path 2 set in an optical transmission path. In addition, the NMS 10A is coupled so as to be communicatable with the transmitting-side optical transmission device 20 and the receiving-side optical transmission device 30. Note that the number of transmitting-side optical transmission devices, receiving-side optical transmission devices, or Paths is not limited to the number illustrated in FIG. 1. In addition, while, in FIG. 1, for convenience of explanation, functions of transmission and reception are separated and described in such a manner as those of the transmitting-side optical transmission device 20 and the receiving-side optical transmission device 30, each of the optical transmission devices may have both functions of transmission and reception.

The NMS 10A manages and controls the transmitting-side optical transmission device 20 and the receiving-side optical transmission device 30. The NMS 10A includes a path setting unit 11A and a path information notification unit 12A. The path setting unit 11A receives, from an operator terminal, not illustrated, a path setting request to set a path of a super channel between the transmitting-side optical transmission device 20 and the receiving-side optical transmission device 30. The super channel includes sub carriers whose bands are different, in other words, sub channels.

Upon receiving the path setting request, the path setting unit 11A confirms free bands of Path 1 and Path 2. The path setting unit 11A allocates individual sub carriers of the super channel, which are to be set between the transmitting-side optical transmission device 20 and the receiving-side optical transmission device 30, to bands that are included in the free bands of Path 1 and/or Path 2 and that coincide with wavelengths of the respective sub carriers.

If all the bands that coincide with the wavelengths of the respective sub carriers are free bands in Path 1, the path setting unit 11A allocates all the sub carriers to Path 1, thereby setting, in Path 1, a path of the super channel. In addition, if all the bands that coincide with the wavelengths of the respective sub carriers are free bands in Path 2, the path setting unit 11A allocates all the sub carriers to Path 2, thereby setting, in Path 2, a path of the super channel.

In addition, in a case where some bands out of the bands that coincide with the wavelengths of the respective sub carriers are free bands in Path 1 and remaining bands out thereof are free bands in Path 2, the path setting unit 11A sets a path of the super channel in Path 1 and Path 2 as follows. In other words, the path setting unit 11A allocates sub carriers, whose wavelengths coincide with some bands, to Path 1 and allocates sub carriers, whose wavelengths coincide with the remaining bands, to Path 2, thereby dividing the path of the super channel into Path 1 and Path 2 and setting the path.

The path information notification unit 12A notifies the transmitting-side optical transmission device 20 and the receiving-side optical transmission device 30 of path setting information including directional path information of the path of the super channel set by the path setting unit 11A and information of bands used in respective directional paths, transmission distance of the respective directional paths, a fiber type, and so forth. The pieces of information such as the path setting information, transmission distances of the respective directional paths, and the fiber type are pieces of information for each of groups of respective transmitters in the transmitting-side optical transmission device 20 and respective receivers in the receiving-side optical transmission device 30, the groups each performing communication. In accordance with the directional path information given notice of by the path information notification unit 12A, the transmitting-side optical transmission device 20 and the receiving-side optical transmission device 30 perform communication.

The transmitting-side optical transmission device 20 includes transmitters 21-1 to 21-8, a CDC block unit 22, wavelength selection units 23a and 23b, and amplifiers 24a and 24b. The transmitters 21-1 to 21-8 each input, to the CDC block unit 22, an optical signal into which an electric signal output by a terminal, not illustrated, is electrical-optical converted. Note that the number of the transmitters 21-1 to 21-8, the number of the wavelength selection units 23a and 23b, or the number of the amplifiers 24a and 24b is not limited to the number illustrated in FIG. 1.

The CDC block unit 22 is a functional unit for transmitting and receiving optical signals to be subjected to Add/Drop regardless of wavelengths (Color) and directional paths (Direction) while the optical signals are not subjected to signal collision (Contention). The term "CDC" is an abbreviation for "Colorless, Directionless, and Contentionless". The CDC block unit 22 inputs the optical signals output by the respective transmitters 21-1 to 21-8 to the wavelength selection units 23a and 23b that correspond to directional paths serving as Paths specified by the path setting information given notice of by the NMS 10A.

The wavelength selection unit 23a is a switch that selects, from among wavelength components of the optical signals input by the CDC block unit 22, wavelength components that coincide with bands used in Path 1 and specified by the path setting information given notice of by the NMS 10A and inputs the wavelength components to the amplifier 24a. The wavelength selection unit 23b is a switch that selects, from among wavelength components of the optical signals input by the CDC block unit 22, wavelength components that coincide with bands used in Path 2 and specified by the path setting information given notice of by the NMS 10A and inputs the wavelength components to the amplifier 24b. The amplifiers 24a and 24b amplify and output optical signals of input wavelength components to the Path 1 and the Path 2, respectively.

The receiving-side optical transmission device 30 includes amplifiers 31a and 31b, wavelength selection units 32a and 32b, a CDC block unit 33, optical delay devices 34-1 to 34-8, photoelectric converters 35-1 to 35-8, buffers 36-1 to 36-8, and receivers 37-1 to 37-8. Note that the number of the amplifiers 31a and 31b, the number of the wavelength selection units 32a and 32b, the number of the optical delay devices 34-1 to 34-8, the number of the photoelectric converters 35-1 to 35-8, the number of the buffers 36-1 to 36-8, or the number of the receivers 37-1 to 37-8 is not limited to the number illustrated in FIG. 1.

The amplifiers 31a and 31b amplify and input optical signals, received via the respective Path 1 and Path 2, to the wavelength selection units 32a and 32b, respectively. The wavelength selection unit 32a is a switch that selects, from among wavelength components of the optical signal input by the amplifier 31a, wavelength components that coincide with bands used in Path 1 and specified by the path setting information given notice of by the NMS 10A and inputs the wavelength components to the CDC block unit 33. The wavelength selection unit 32b is a switch that selects, from among wavelength components of the optical signal input by the amplifier 31b, wavelength components that coincide with bands used in Path 2 and specified by the path setting information given notice of by the NMS 10A and inputs the wavelength components to the CDC block unit 33.

The CDC block unit 33 has the same function as that of the CDC block unit 22. The CDC block unit 33 inputs the optical signal input by the wavelength selection unit 32a to the optical delay devices 34-1 to 34-8 that correspond to respective directional paths serving as Paths specified by the path setting information given notice of by the NMS 10A. Based on delay information or the like based on transmission distances given notice of by an optical delay calculation unit 38, the optical delay devices 34-1 to 34-8 optically delay the respective optical signals that correspond to respective sub carriers and that are input by the CDC block unit 33, thereby performing optical delay compensation thereon so that individual delay amounts become equal to one another. Details of this optical delay compensation will be described later. The optical delay devices 34-1 to 34-8 input, to the corresponding photoelectric converters 35-1 to 35-8, respectively, the respective optical signals that correspond to the respective sub carriers and that are subjected to the optical delay compensation.

The photoelectric converters 35-1 to 35-8 input, to the corresponding buffers 36-1 to 36-8, respectively, electric signals into which the input optical signals are photoelectrically converted. In accordance with an instruction from the optical delay calculation unit 38, the buffers 36-1 to 36-8 delay the respective input electric signals corresponding to the respective sub carriers, thereby performing delay compensation so that respective delay amounts become equal to one another. Details of this delay compensation will be described later. The buffers 36-1 to 36-8 input, to the corresponding receivers 37-1 to 37-8, respectively, the respective delayed electric signals corresponding to the respective sub carriers. The receivers 37-1 to 37-8 detect delays caused by wavelength differences between the respective input electric signals corresponding to the respective sub carriers and notify the after-mentioned optical delay calculation unit 38 thereof.

The optical delay calculation unit 38 monitors residual dispersions of the respective sub carriers based on pieces of delay information that are caused by the wavelength differences between the individual electric signals corresponding to the respective sub carriers and that are given notice of by the respective receivers 37-1 to 37-8, and accordingly the optical delay calculation unit 38 obtains delay differences from the residual dispersions. In addition, at the time of calculating the delay differences, the optical delay calculation unit 38 uses transmission distances and fiber types of transmission paths of the respective sub carriers, given notice of by the NMS 10A. Details of the calculation of the delay differences performed by the optical delay calculation unit 38 will be described later.

Configuration of CDC Block Unit According to First Embodiment

Figure 2:
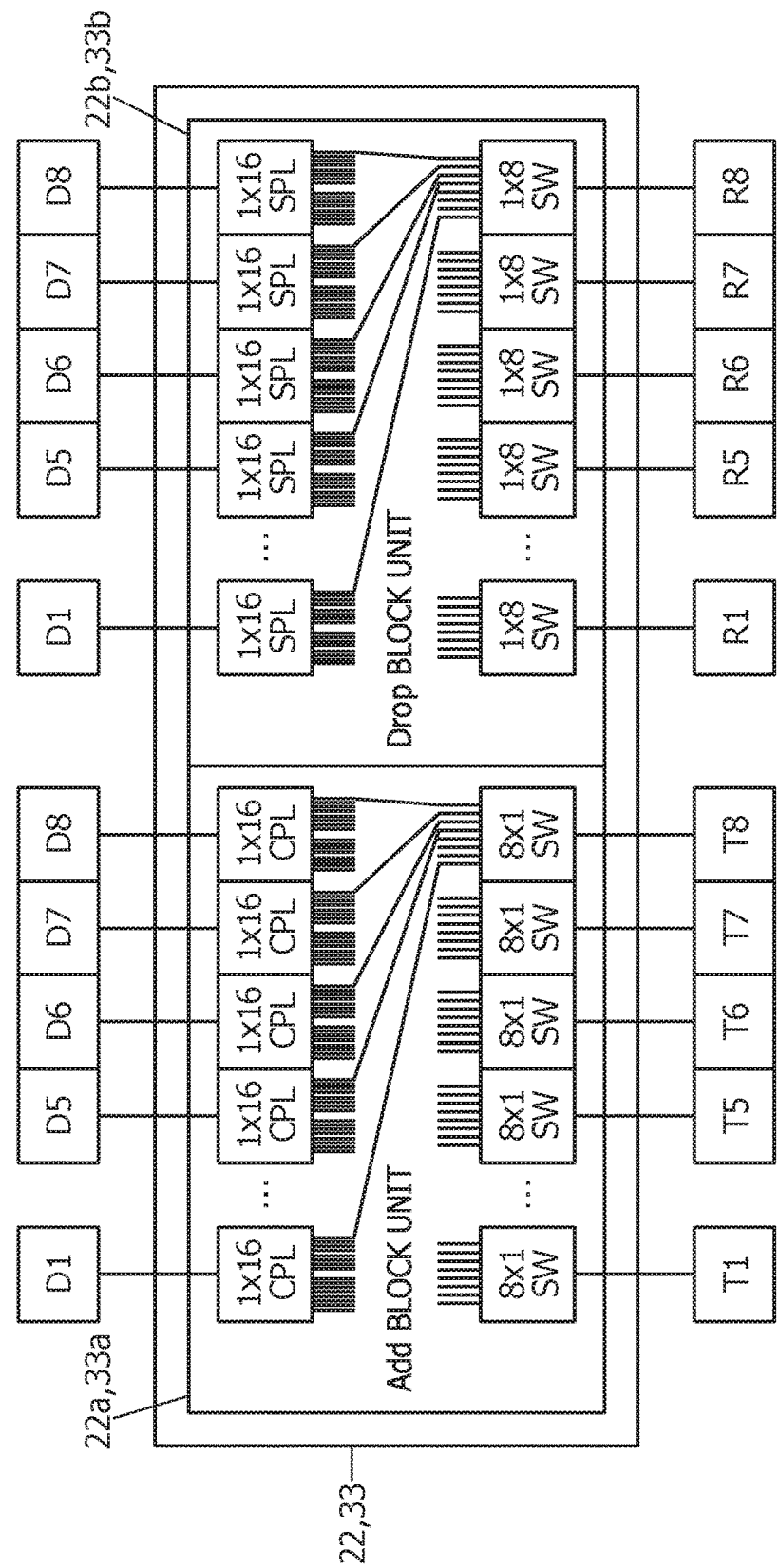
FIG. 2 is a diagram illustrating an example of a configuration of a CDC block unit according to the first embodiment.

FIG. 2 is a diagram illustrating an example of a configuration of a CDC block unit according to the first embodiment. Since the CDC block units 22 and 33 according to the first embodiment have the same configuration, the CDC block unit 22 will be described as a representative therefor. The CDC block unit 22 is an example of an 8×16 multicast switch. The CDC block unit 22 includes an Add block unit 22a and a Drop block unit 22b.

The Add block unit 22a is a transmitting-side function of the CDC block unit 22. The Add block unit 22a includes 8 8×1 SWs (SWitches, switches), to each of which one of transmitters Tx (for example, x=1 to 8) is coupled, and 8 1×16 CPLs (CouPLers, couplers), to each of which one of directional paths Dx (for example, x=1 to 8) is coupled. The 8×1 SWs each switch between the directional paths Dx serving as output destinations of an optical signal output by the corresponding transmitter Tx. The 1×16 CPLs each multiplex optical signals input by the respective 8×1 SWs corresponding to the respective transmitters Tx and each output to the corresponding directional path Dx, thereby selecting directional paths to which the respective optical signals output by the respective transmitters Tx are output.

The Drop block unit 22b is a receiving-side function of the CDC block unit 22. The Drop block unit 22b includes 8 1×8 SWs (SWitches, switches), to each of which one of receivers Rx (for example, x=1 to 8) is coupled, and 8 1×16 SPLs (SPLitters, splitters), to each of which one of directional paths Dx (for example, x=1 to 8) is coupled. The 1×16 SPLs each demultiplexes an optical signal input from the corresponding directional path Dx. The 1×8 SWs each switch between the receivers Rx serving as input destinations of the optical signals input from the respective directional paths Dx, thereby selecting the receivers Rx by which the respective optical signals input from the respective directional paths Dx are received.

Processing for Path Setting According to First Embodiment

FIG. 3 is a flowchart illustrating an example of a procedure of processing for a path setting according to the first embodiment. Note that the processing for a path setting illustrated in FIG. 3 illustrates an example in which embodiments of individual nodes serving as optical transmission devices and transmission paths are those illustrated in FIG. 4A and FIG. 4B. The processing for a path setting according to the first embodiment is performed every time a demand for a path setting occurs.

First, the path setting unit 11A in the NMS 10A recognizes that a demand for setting a path of a super channel, whose band corresponds to wavelengths of λ4 to λ6 and which leads to a node Z serving as the receiving-side optical transmission device 30, occurs from a node C serving as the transmitting-side optical transmission device 20 (step S11). Here, the demand for a path setting may be input by a terminal, not illustrated, and may be based on autonomous determination of the NMS 10A. Next, the path setting unit 11A confirms free bands of Paths n (n=1, 2) (step S12). Next, the path setting unit 11A determines whether or not bands of wavelengths of λ4 to λ6 are free in Path 1 (step S13). In a case where it is determined that the bands of the wavelengths of λ4 to λ6 are free in Path 1 (step S13: Yes), the path setting unit 11A shifts the processing to step S18. On the other hand, in a case where it is determined that the bands of the wavelengths of λ4 to λ6 are not free in Path 1 (step S13: No), the path setting unit 11A shifts the processing to step S14.

In step S14, the path setting unit 11A determines whether or not the bands of the wavelengths of λ4 to λ6 are free in Path 2. In a case where it is determined that the bands of the wavelengths of λ4 to λ6 are free in Path 2 (step S14: Yes), the path setting unit 11A shifts the processing to step S19. On the other hand, in a case where it is determined that the bands of the wavelengths of λ4 to λ6 are not free in Path 2 (step S14: No), the path setting unit 11A shifts the processing to step S15.

In step S15, the path setting unit 11A determines whether or not the bands of the wavelengths of λ4 to λ6 are free in Path 1+Path 2. In a case where it is determined that the bands of the wavelengths of λ4 to λ6 are free in Path 1+Path 2 (step S15: Yes), the path setting unit 11A shifts the processing to step S16. On the other hand, in a case where it is determined that the bands of the wavelengths of λ4 to λ6 are not free in Path 1+Path 2 (step S15: No), the path setting unit 11A shifts the processing to step S20.

In step S16, the path setting unit 11A divides the bands of the wavelengths of λ4 to λ6 into individual bands free in Path 1 or Path 2. Next, the path setting unit 11A instructs the node C and the node Z to set the respective bands in Path 1 and Path 2, divided in step S16, as bands of respective sub carriers of λ4 to λ6 of the super channel (step S17). In this way, the path setting unit 11A divides bands of wavelengths into individual bands free in Path 1 or Path 2 and sets sub carriers of the super channel in each of Path 1 and Path 2. Therefore, it is possible to flexibly set a path for the super channel.

On the other hand, in step S18, the path setting unit 11A instructs the node C and the node Z to set, in Path 1, bands of the respective sub carriers of λ4 to λ6 of the super channel. In addition, in step S19, the path setting unit 11A instructs the node C and the node Z to set, in Path 2, the bands of the respective sub carriers of λ4 to λ6 of the super channel. In addition, in step S20, it is difficult for the path setting unit 11A to set the bands of the respective sub carriers of λ4 to λ6 of the super channel in Path 1 or Path 2, and it is determined that transmission is difficult to perform.

If respective processing operations in steps S17 to S20 finish, the path setting unit 11A shifts the processing to step S21. In step S21, in a case where the processing shifts from one of steps S17 to S19, the path information notification unit 12A in the NMS 10A notifies the node C and the node Z of a transmission distance and a fiber type of a transmission path of each of the sub carriers. In addition, in step S21, in a case where the processing shifts from S20, the path information notification unit 12A notifies the node C and the node Z that transmission is difficult to perform. If the processing operation in step S21 finishes, the path setting processing according to the first embodiment is terminated.

Outline of Processing for Path Setting According to First Embodiment

Figure 4A:
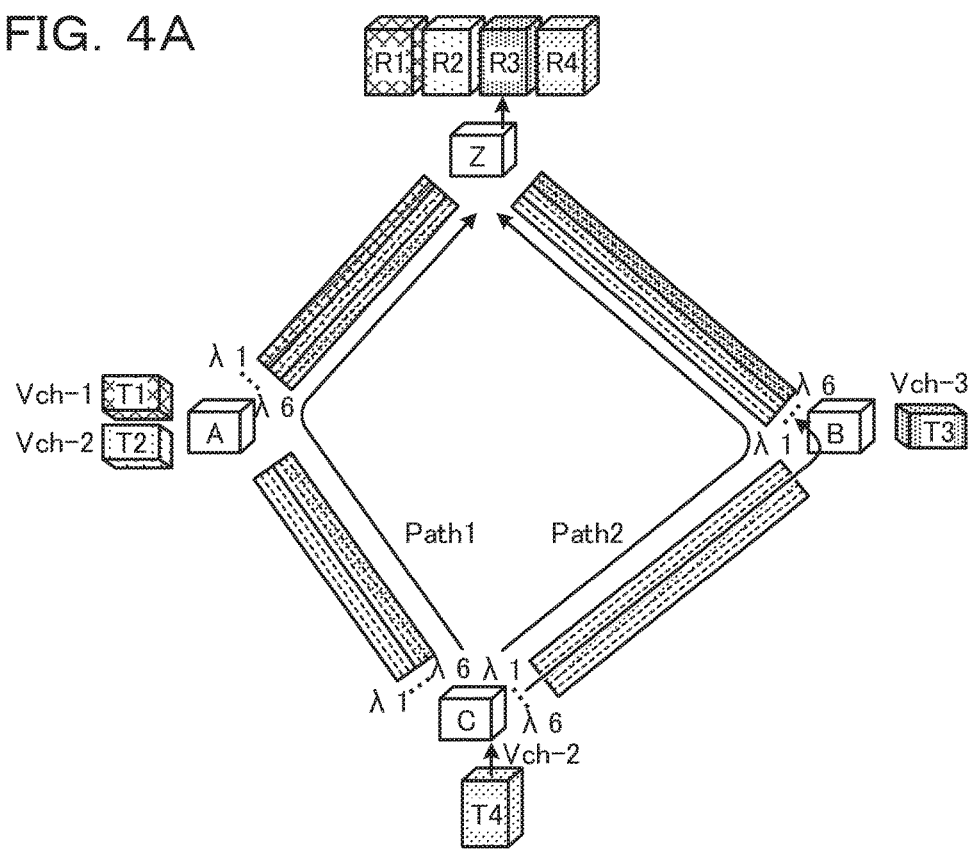
FIG. 4A is a diagram illustrating an example of an outline of the processing for a path setting according to the first embodiment.
Figure 4B:
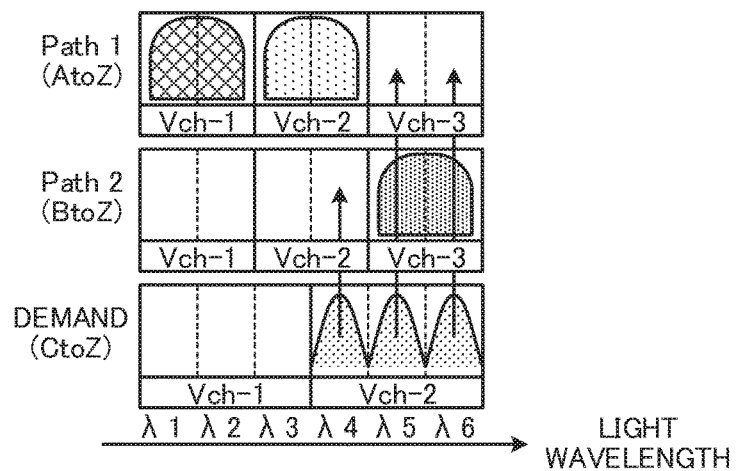
FIG. 4B is a diagram illustrating an example of an outline of the processing for a path setting according to the first embodiment.

FIG. 4A and FIG. 4B are diagrams each illustrating an example of an outline of the processing for a path setting according to the first embodiment. FIG. 4A and FIG. 4B illustrate a case where steps S15 to S17 are performed in the processing for a path setting according to the first embodiment, illustrated in FIG. 3.

As illustrated in FIG. 4A and FIG. 4B, in a section between the node A and the node Z in Path 1, a channel Vch-1 whose band corresponds to wavelengths λ1 and λ2 is used for communication between the transmitter T1 and the receiver R1. In addition, in the section between the node A and the node Z in Path 1, a channel Vch-2 whose band corresponds to wavelengths λ3 and λ4 is used for communication between the transmitter T2 and the receiver R2. On the other hand, in a section between a node B and the node Z in Path 2, a channel Vch-3 whose band corresponds to wavelengths λ5 and λ6 is used for communication between the transmitter T3 and the receiver R3. In such a state, it is assumed that, in a section between the node C and the node Z, a demand occurs which is used for setting, for communication between the transmitter T4 and the receiver R4, a super channel that uses a channel Vch-2 whose band corresponds to the wavelengths λ4 to λ6.

At this time, while, as illustrated in FIG. 4B, the channel Vch-2 requested by the demand uses the bands of the wavelengths λ4 to λ6, each of Path 1 and Path 2 is not in a state in which all the bands of the wavelengths λ4 to λ6 are free (No in each of steps S13 and S14 in FIG. 3). However, as illustrated in FIG. 4B, both the bands of wavelengths λ5 and λ6 are free in Path 1, and the band of the wavelength λ4 is free in Path 2 (Yes in step S15 in FIG. 3). Therefore, the NMS 10A divides the Vch-2 of the demand into the wavelength λ4 and the wavelengths λ5 and λ6 (step S16 in FIG. 3).

In addition, the NMS 10A allocates the bands of the wavelengths λ5 and λ6 to the Vch-3 in Path 1 and allocates the band of the wavelength λ4 to a portion of the Vch-2 in Path 2, thereby setting the super channel between the node C and the node Z (step S17 in FIG. 3). In this way, even in a case where it is difficult to set the transmission path of the super channel in a single Path between the node C and the node Z, the NMS 10A allocates the sub carriers of the super channel to free bands of individual Paths in a division manner. From this, the first embodiment is able to flexibly set the transmission path of the super channel.

Regarding Optical Delay Compensation

Figure 5A:
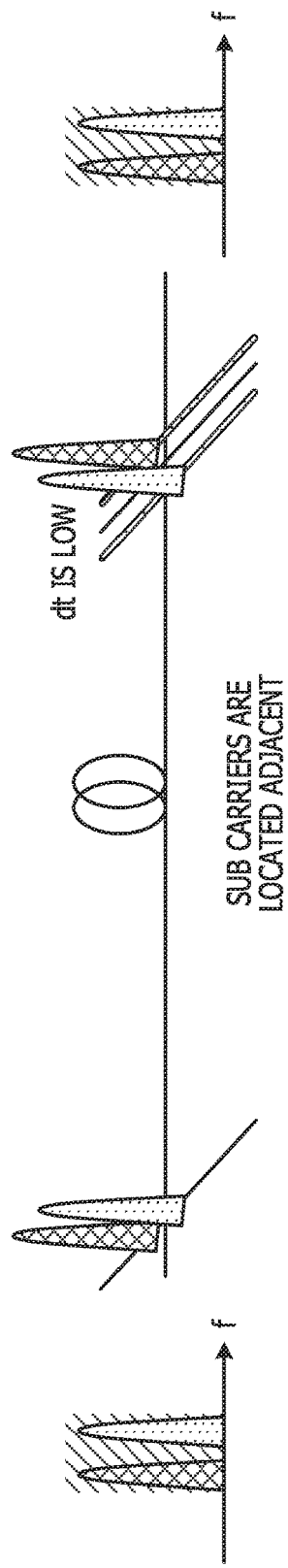
FIG. 5A is a diagram illustrating an example of an outline of an optical delay.
Figure 5B:
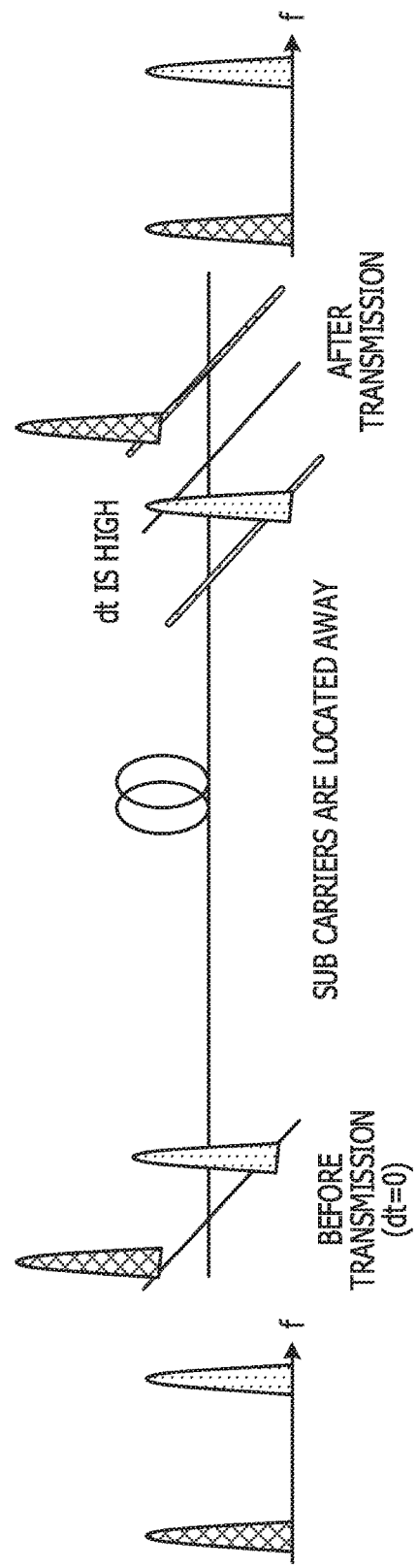
FIG. 5B is a diagram illustrating an example of an outline of the optical delay.

In the first embodiment, it is possible to allocate the sub carriers of the super channel to free bands of individual Paths in a division manner, thereby setting a transmission path of the super channel. However, in a case of performing transmission by dividing one super channel to sub carriers, a difference between wavelength dispersions, a difference between transmission path types of optical fiber, a difference between path lengths, or the like causes arrival times to receivers of respective sub carriers to be different, and a skew occurs. FIG. 5A and FIG. 5B are diagrams each illustrating an example of an outline of an optical delay.

As illustrated in, for example, FIG. 5A, in a case where transmission paths of respective sub carriers are equal to each other and the sub carriers are located adjacent to each other, a difference between wavelength dispersions or the like causes an optical delay to occur between the individual sub carriers while a delay amount is relatively low. As illustrated in, for example, FIG. 5B, in a case where transmission paths of respective sub carriers are equal to each other and the sub carriers are not located adjacent to each other, a difference between wavelength dispersions or the like causes a relatively high optical delay to occur between the individual sub carriers. Furthermore, in a case where transmission paths of the respective sub carriers are different from each other, a difference between transmission path types of optical fiber, a difference between path lengths, or the like causes a delay amount of an optical delay between individual subcarriers to become higher.

Figure 6A:
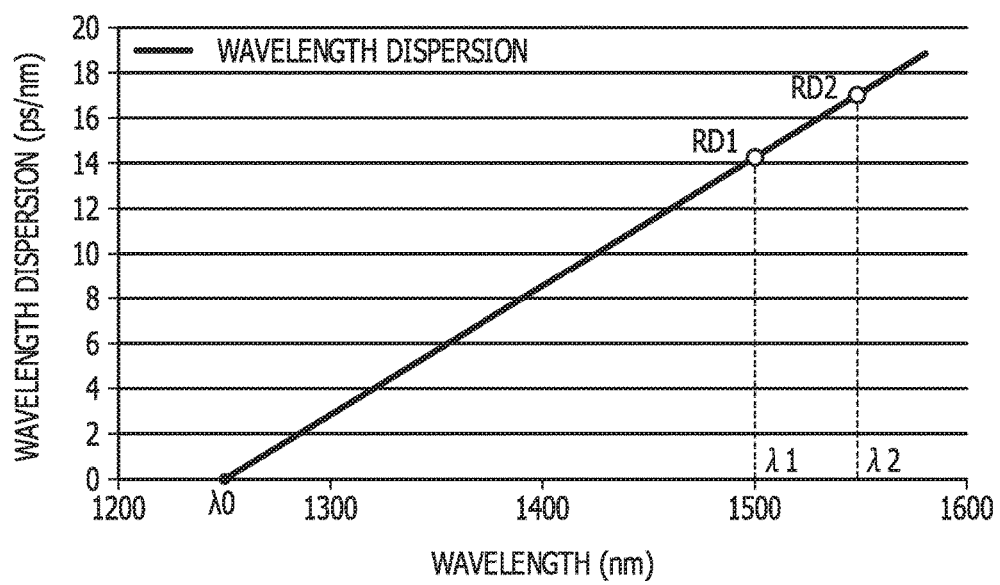
FIG. 6A is a diagram illustrating an example of a relationship between a wavelength and a wavelength dispersion.
Figure 6B:
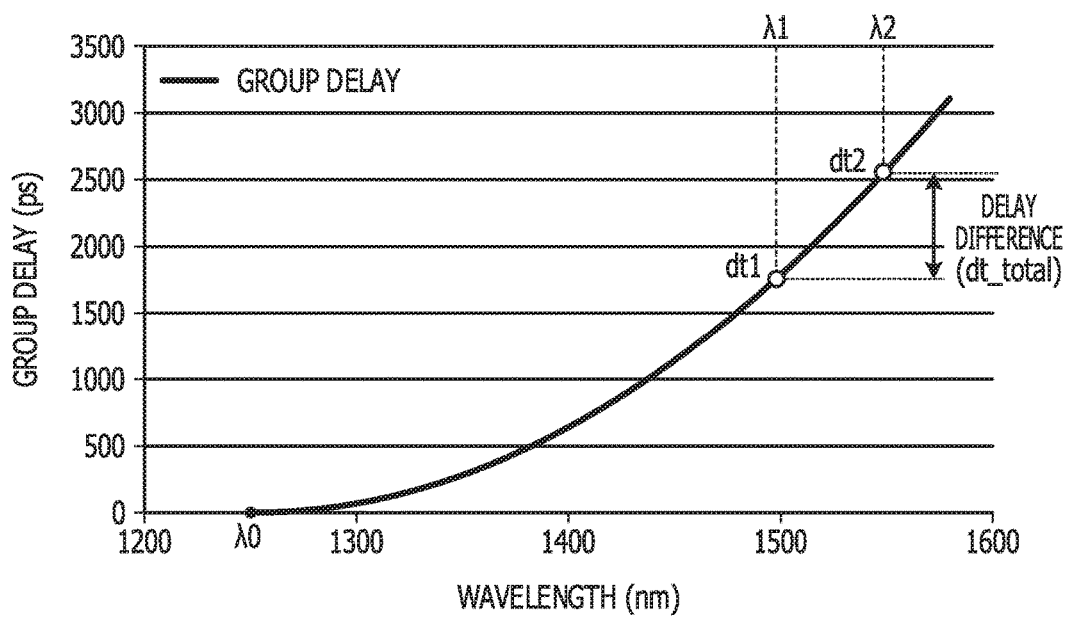
FIG. 6B is a diagram illustrating an example of a relationship between a wavelength and a group delay.

In general, in a digital coherent system, it is possible to obtain a delay from a residual dispersion sensed in a receiving end. FIG. 6A is a diagram illustrating an example of a relationship between a wavelength and a wavelength dispersion. In addition, FIG. 6B is a diagram illustrating an example of a relationship between a wavelength and a group delay. For example, it is assumed to obtain a delay difference between a sub carrier 1 and a sub carrier 2 that travel along a same transmission path. As for an optical fiber whose relationship between a wavelength and a wavelength dispersion of an optical signal is illustrated in FIG. 6A, the residual dispersion RD1 of the sub carrier 1, sensed in a receiving end, satisfies RD1=about 14 ps/nm in a case of the wavelength $\lambda 1$=about 1,500 nm. In addition, as for the optical fiber whose relationship between a wavelength and a wavelength dispersion of an optical signal is illustrated in FIG. 6A, the residual dispersion RD2 of the sub carrier 2, sensed in a receiving end, satisfies RD2=about 16.5 ps/nm in a case of the wavelength $\lambda 2$=about 1,550 nm. In addition, in a straight line illustrated in FIG. 6A, a zero-dispersion wavelength $\lambda 0$ at which a wavelength dispersion is 0 ps/nm satisfies the zero-dispersion wavelength $\lambda 0$=about 1,250 nm.

In addition, as illustrated in FIG. 6B, group delays of the wavelengths $\lambda 1$ and $\lambda 2$ with respect to the zero-dispersion wavelength $\lambda 0$ are values obtained by integrating the straight line in an interval $[\lambda 0, \lambda 1]$ and an interval $[\lambda 0, \lambda 2]$, respectively. In other words, the group delays of the wavelengths $\lambda 1$ and $\lambda 2$ with respect to the zero-dispersion wavelength $\lambda 0$ are expressed by the following Expression (1) and Expression (2). In addition, in accordance with the following Expression (3) obtained by subtracting the following Expression (1) from the following Expression (2), it is possible to obtain a delay difference between the wavelengths $\lambda 1$ and $\lambda 2$.

$$dt1 = (RD1/d\lambda 1/2) \times (d\lambda 1)^2 \quad (1)$$

$$dt2 = (RD2/d\lambda 2/2) \times (d\lambda 2)^2 \quad (2)$$

$$dt\_total = dt2 - dt1 \quad (3)$$

provided that
$\begin{cases} \lambda 1\text{: the wavelength of the sub carrier 1} \\ \lambda 2\text{: the wavelength of the sub carrier 2} \\ d\lambda 1\text{: the wavelength of the sub carrier 1 } - \\ \quad \text{the zero-dispersion wavelength} \\ d\lambda 2\text{: the wavelength of the sub carrier 2 } - \\ \quad \text{the zero-dispersion wavelength} \\ RD1\text{: the residual dispersion of the sub carrier 1} \\ RD2\text{: the residual dispersion of the sub carrier 2} \\ dt1\text{: the delay difference of } \lambda 1 \text{ with respect} \\ \quad \text{to the zero-dispersion wavelength} \\ dt2\text{: the delay difference of } \lambda 2 \text{ with respect} \\ \quad \text{to the zero-dispersion wavelength} \\ dt\_total\text{: a delay difference between } \lambda 2 \text{ and } \lambda 1 \end{cases}$ In addition, for example, it is assumed to obtain a delay difference between the sub carrier 1 and the sub carrier 2 that travel along respective transmission paths different from each other. The delay difference between the sub carrier 1 and the sub carrier 2 that travel along the respective transmission paths different from each other is obtained as illustrated in the following Expression (8). Compared with the above-mentioned Expression (3), the following Expression (8) is different in having a term of (T2−T1) of a delay difference caused by a difference between paths and is equal in other terms.

$$L1 = RD1/Dcoeff(\lambda 1) \quad (4)$$

$$L2 = RD2/Dcoeff(\lambda 2) \quad (5)$$

$$T1 = L1/(c/n) \quad (6)$$

$$T2 = L2/(c/n) \quad (7)$$

$$dt\_total = (dt2 - dt1) + (T2 - T1) \quad (8)$$

provided that
$\begin{cases} RD1\text{: the residual dispersion of the sub carrier 1} \\ RD2\text{: the residual dispersion of the sub carrier 2} \\ dt1\text{: the delay difference of } \lambda 1 \text{ with respect} \\ \quad \text{to the zero-dispersion wavelength} \\ dt2\text{: the delay difference of } \lambda 2 \text{ with respect} \\ \quad \text{to the zero-dispersion wavelength} \\ dt\_total\text{: a delay difference between } \lambda 2 \text{ and } \lambda 1 \\ L1\text{: the distance of } \lambda 1 \\ L2\text{: the distance of } \lambda 2 \\ Dcoeff\text{: a dispersion coefficient} \\ c\text{: the light speed} \\ n\text{: the refraction index of an optical fiber} \end{cases}$ Note that T1 and T2 in the above-mentioned Expression (8) are defined by the above-mentioned Expression (6) and Expression (7), respectively. Furthermore, L1 and L2 in the above-mentioned Expression (6) and Expression (7) are defined by the above-mentioned Expression (4) and Expression (5), respectively. Here, Dcoeff(*) is a dispersion value of about 16 ps/nm/km per a wavelength of 1,550 nm in a single mode fiber (SMF).

In other words, in the above-mentioned Expression (4), the distance L1 of a transmission path along which the sub carrier of the wavelength λ1 travels is a value obtained by dividing the residual dispersion RD1 of the sub carrier of the wavelength λ1 by the dispersion coefficient of the sub carrier of the wavelength λ1. In addition, in the above-mentioned Expression (5), the distance L2 of a transmission path along which the sub carrier of the wavelength λ2 travels is a value obtained by dividing the residual dispersion RD2 of the sub carrier of the wavelength λ2 by the dispersion coefficient of the sub carrier of the wavelength λ2. In addition, "T1" in the term of (T2−T1) of a delay difference in the above-mentioned Expression (8) is a value obtained by dividing "L1" by the light speed and the refractive index of an optical fiber serving as a transmission path. In addition, "T2" in the term of (T2−T1) of a delay difference in the above-mentioned Expression (8) is a value obtained by dividing "L2" by the light speed and the refractive index of an optical fiber serving as a transmission path.

Processing for Delay Amount Compensation According to First Embodiment

Figure 7:
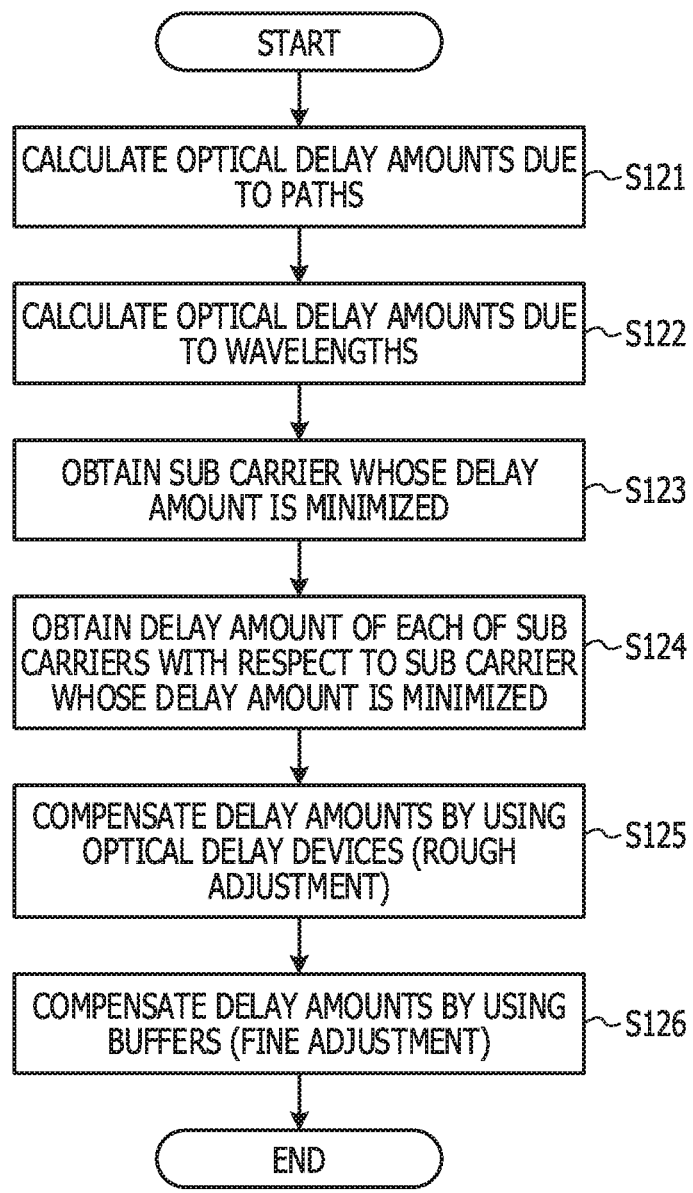
FIG. 7 is a flowchart illustrating an example of a procedure of processing for delay amount compensation according to the first embodiment.

FIG. 7 is a flowchart illustrating an example of a procedure of processing for delay amount compensation according to the first embodiment. A processing main body of the processing for delay amount compensation according to the first embodiment is the receiving-side optical transmission device 30. The processing for delay amount compensation according to the first embodiment is performed periodically or every time a residual dispersion is sensed in the receivers 37-1 to 37-8. The receiving-side optical transmission device 30 is preliminarily notified of the wavelengths of the respective sub carriers of the super channel, the distances of transmission paths, fiber types of transmission path, and so forth by the NMS 10A.

First, based on the above-mentioned Expression (4) to Expression (7), the optical delay calculation unit 38 in the receiving-side optical transmission device 30 calculates optical delay amounts due to paths (step S121). Next, based on the above-mentioned Expression (1) to Expression (3), the optical delay calculation unit 38 calculates optical delay amounts due to wavelengths (step S122). Next, based on the above-mentioned Expression (8), the optical delay calculation unit 38 obtains delay amounts of the respective sub carriers and obtains a sub carrier whose delay amount is minimized (step S123). Next, based on the above-mentioned Expression (8), the optical delay calculation unit 38 obtains delay amounts of respective sub carriers with respect to the sub carrier whose delay amount is minimized and that is obtained in step S123 (step S124).

Next, by controlling the optical delay devices 34-1 to 34-8, the optical delay calculation unit 38 compensates, in an optical signal level, the delay amounts of the respective sub carriers so that the delay amounts of all the sub carriers become equal to that of the sub carrier whose delay amount is minimized and that is obtained in step S123 (step S125). Next, by controlling the buffers 36-1 to 36-8, the optical delay calculation unit 38 compensates, in an electric signal level, the delay amounts of the respective sub carriers so that the delay amounts of all the sub carriers become equal to that of the sub carrier whose delay amount is minimized and that is obtained in step S123 (step S126). If step S126 finishes, the optical delay calculation unit 38 terminates the processing for the delay amount compensation.

Outline of Processing for Delay Compensation

Figure 8A:
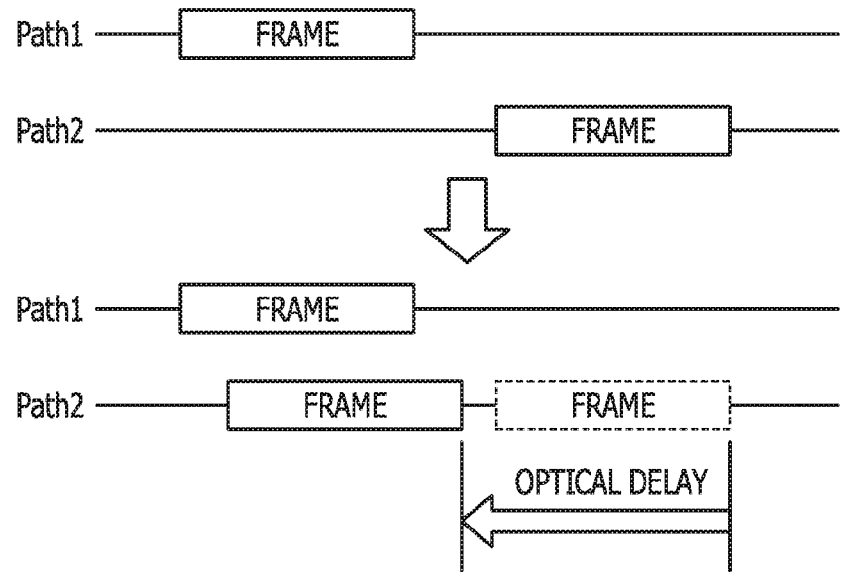
FIG. 8A is a diagram illustrating an example of an outline of processing for delay compensation (in an optical signal level) according to the first embodiment.
Figure 8B:
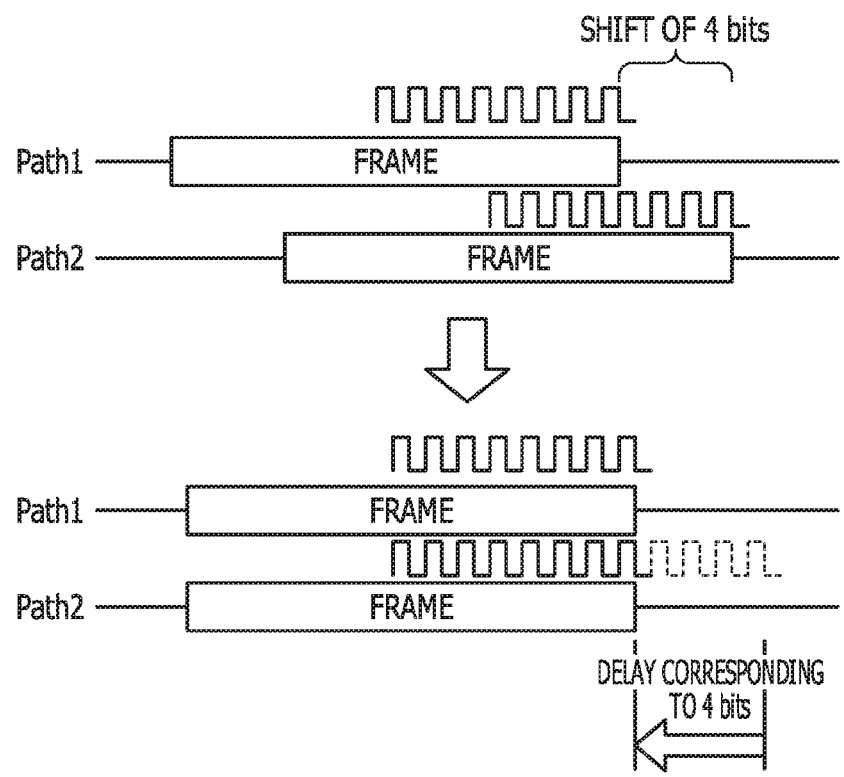
FIG. 8B is a diagram illustrating an example of an outline of processing for delay compensation (in an electric signal level) according to the first embodiment.

FIG. 8A is a diagram illustrating an example of an outline of processing for delay compensation (in an optical signal level) according to the first embodiment. FIG. 8B is a diagram illustrating an example of an outline of processing for delay compensation (in an electric signal level) according to the first embodiment. In a case where a frame that passes through Path 1 is delayed compared with a frame that passes through Path 2, first the frame that passes through Path 2 is delayed in the optical signal level as illustrated in FIG. 8A. In addition, as illustrated in FIG. 8B, after performing delay compensation in the optical signal level, the frame that passes through Path 2 is delayed in units of bits. In this way, a delay difference between the frames of the respective sub carriers that pass through the different transmission paths Path 1 and Path 2 is compensated.

In general, as for the delay compensation, an electronic circuit grows in size in a case where a compensation amount is high. Therefore, in the first embodiment, the delay compensation, performed in the optical signal level and illustrated in step S125 in FIG. 7, and the delay compensation, performed in the electric signal level and illustrated in step S126 in FIG. 7, are concurrently used. Since the compensation amount is high relatively in the delay compensation performed in the optical signal level, the compensation efficiency thereof is high. On the other hand, while the delay compensation performed in the electric signal level is performed in units of bits and the compensation efficiency thereof is low, it is possible to perform fine adjustment. In this way, by concurrently using the delay compensation performed in the optical signal level and the delay compensation performed in the electric signal level, it is possible to realize swift and precise delay compensation. Alternatively, by concurrently using the delay compensation in the optical signal level and the delay compensation in the electric signal level, it is possible to perform delay compensation while suppressing an increase in, for example, the size of a compensation circuit.

Example of Application of First Embodiment

Figure 9A:
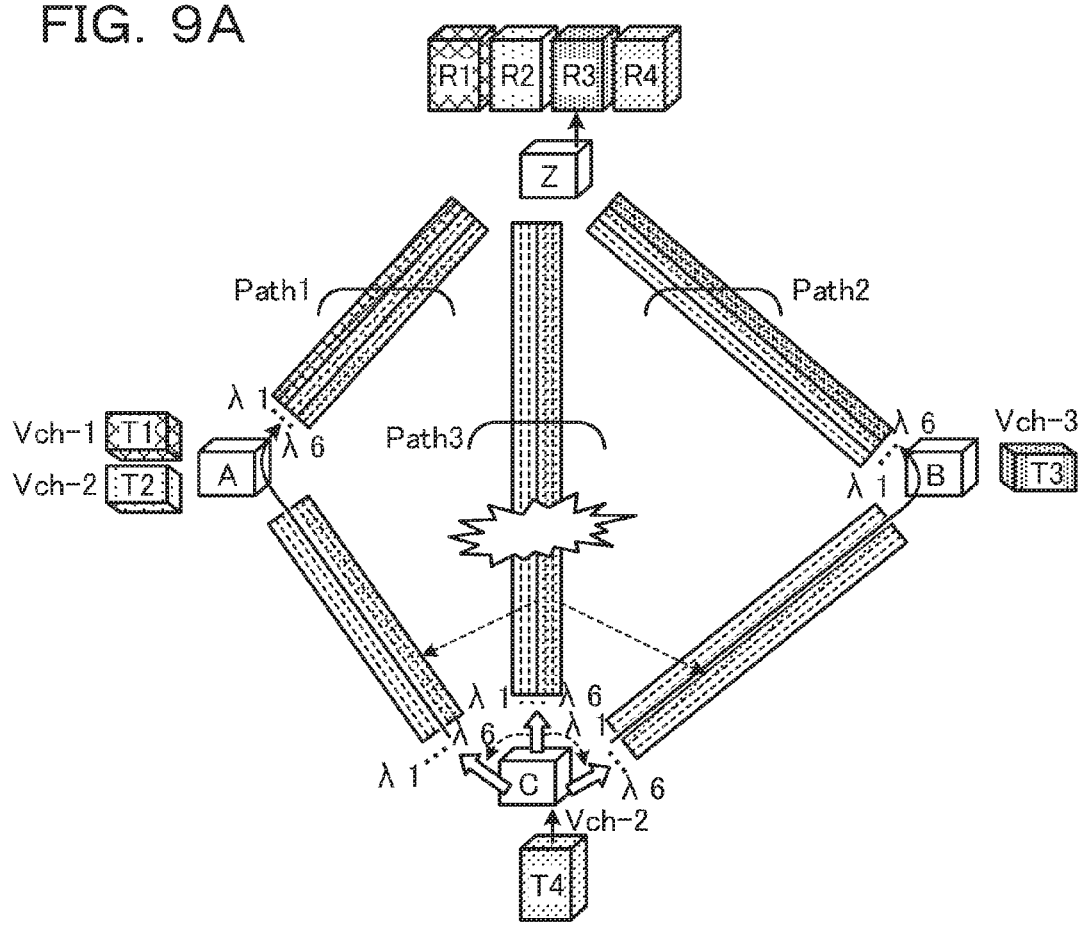
FIG. 9A is a diagram illustrating an example of an application of the first embodiment.
Figure 9B:
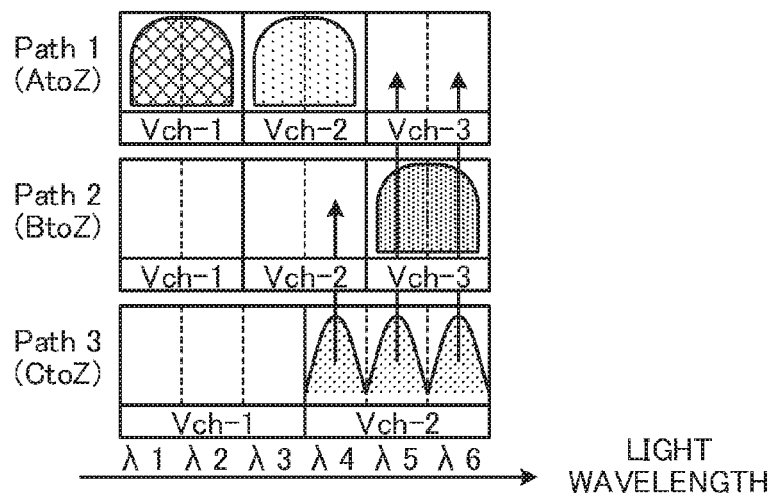
FIG. 9B is a diagram illustrating an example of an application of the first embodiment.

FIG. 9A and FIG. 9B are diagrams each illustrating an example of an application of the first embodiment. FIG. 9A and FIG. 9B illustrate a case where a super channel set in Path 3 is dispersed and reset on Path 1 and Path 2 if a failure occurs in Path 3 out of already set Path 1 to Path 3. A procedure for dispersing and resetting, on Path 1 and Path 2, the super channel set in Path 3 is the same as a path setting of the demand, illustrated in FIG. 4A and FIG. 4B. In this way, in the first embodiment, in a case where a failure that occurs in a transmission path causes a super channel set in one of Paths to be reset in another one of Paths, it is possible to swiftly switch and reset the super channel. Therefore, it is possible to enhance fault tolerance of the super channel.

Advantageous Effects of First Embodiment

In the first embodiment, in a case where it is difficult to set individual sub channels of a super channel in a same path at the time of setting the super channel between optical transmission devices, the individual sub channels are set in different paths. Therefore, it is possible to flexibly perform a path setting for, for example, a super channel.

In addition, in the first embodiment, delay compensation for signals of respective sub channels received via different paths is performed in the optical signal level and the electric signal level. Therefore, it is possible to set the sub channels of a super channel in, for example, different paths, and it is possible to flexibly perform a path setting for the super channel. In addition, by performing, in the optical signal level, delay compensation for the signals of the respective sub channels, it is possible to perform relatively high delay compensation, and by performing, in the electric signal level, delay compensation for the signals of the respective sub channels, it is possible to perform delay compensation in units of, for example, bits. Therefore, in the first embodiment, by concurrently using the delay compensation in the optical signal level and the delay compensation in the electric signal level, it is possible to perform, for example, swift and precise delay compensation. Alternatively, in the first embodiment, by concurrently using the delay compensation in the optical signal level and the delay compensation in the electric signal level, it is possible to perform delay compensation while suppressing an increase in, for example, the size of a compensation circuit.

Second Embodiment

Processing for Path Setting According to Second Embodiment

A second embodiment illustrates processing in a case where no free band in which one out of sub carriers of a super channel is settable exists in each of Paths serving as setting targets. In other words, the second embodiment is an example in which a sub carrier of a wavelength whose free band does not exist is wavelength-converted to a wavelength of a settable free band of Path and set.

Figure 10A:
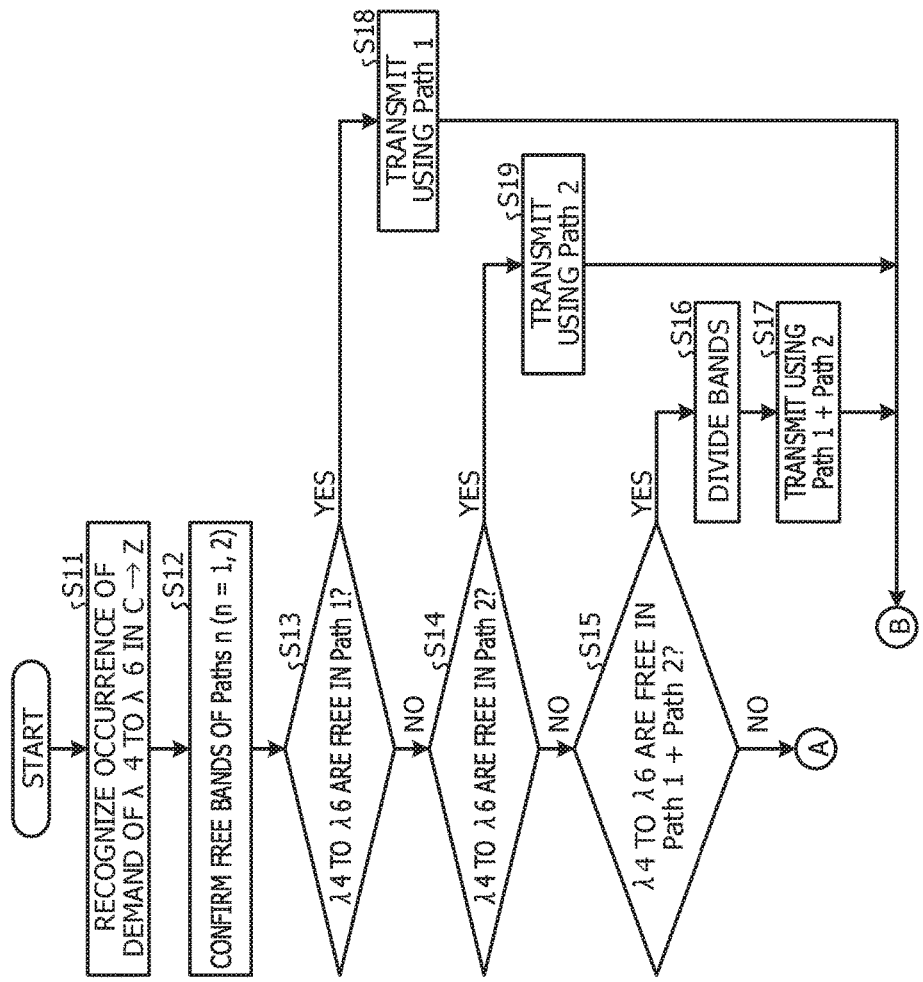
FIGS. 10A and 10B are flowcharts illustrating an example of a procedure of processing for a path setting according to a second embodiment.
Figure 10B:
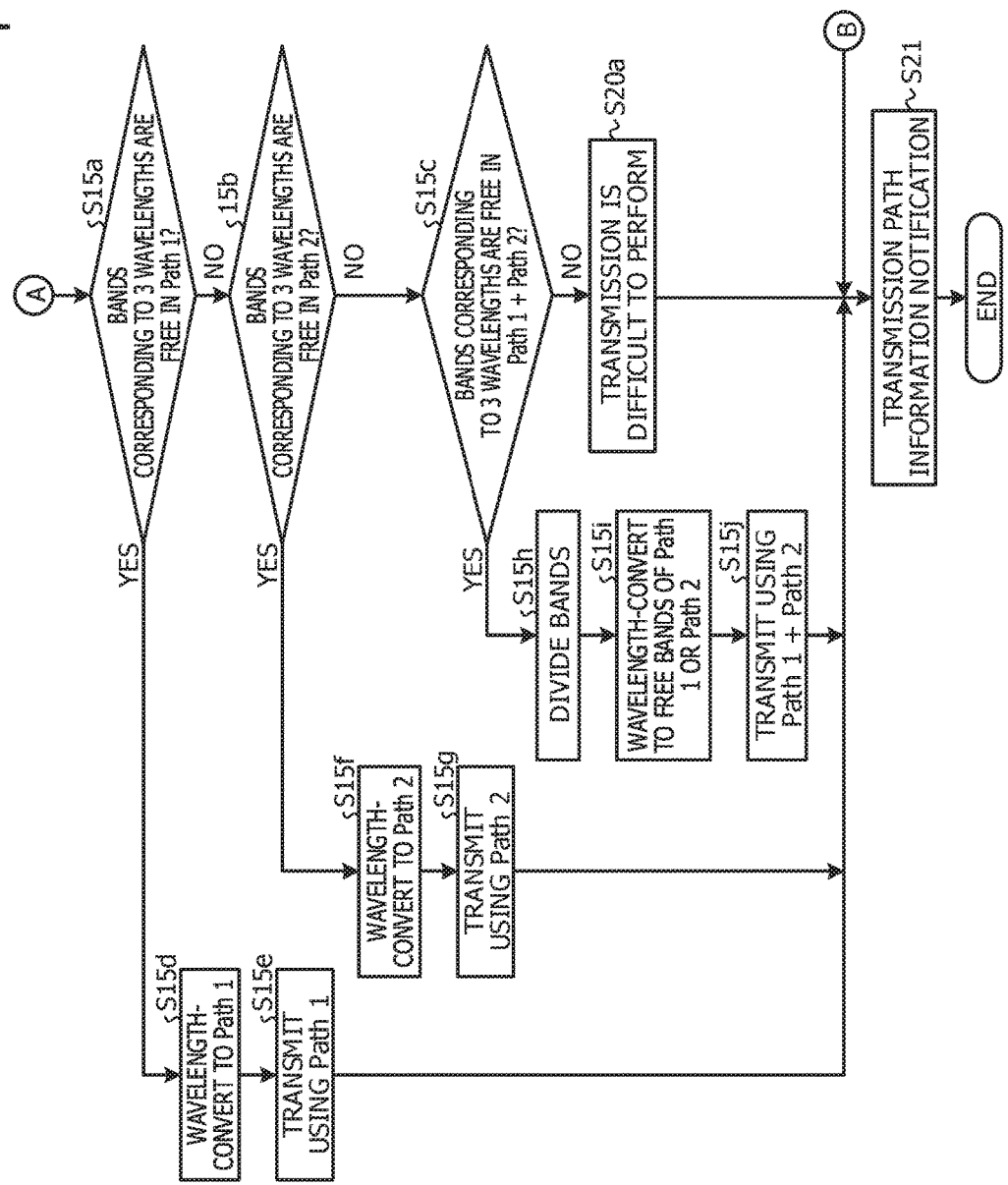

FIG. 10 is a flowchart illustrating an example of a procedure of processing for a path setting according to the second embodiment. Steps S11 to S19 in the processing for a path setting according to the second embodiment, illustrated in FIG. 10, are the same as steps S11 to S19, respectively, in the processing for a path setting according to the first embodiment, illustrated in FIG. 3. The processing for a path setting according to the second embodiment is different from the processing for a path setting according to the first embodiment in the following points. In other words, as illustrated in FIG. 10, in place of the processing operations in step S15 (No) to step S20 in FIG. 3, the path setting unit 11B in the NMS 10B (see FIG. 1) performs processing operations in step S15a to S15j and step S20a. Note that the processing for a path setting illustrated in FIG. 10 illustrates an example in which embodiments of individual nodes serving as optical transmission devices and transmission paths are those illustrated in FIG. 11A and FIG. 11B.

In a case where it is determined that the bands of the wavelengths of λ4 to λ6 are free in Path 1+Path 2 (step S15: Yes), the path setting unit 11B shifts the processing to step S16. On the other hand, in a case where it is determined that the bands of the wavelengths of λ4 to λ6 are not free in Path 1+Path 2 (step S15: No), the path setting unit 11B shifts the processing to step S15a.

In step S15a, the path setting unit 11B determines whether or not bands corresponding to 3 wavelengths of λ4 to λ6 are free in Path 1. In a case where it is determined that the bands corresponding to the 3 wavelengths of λ4 to λ6 are free in Path 1 (step S15a: Yes), the path setting unit 11B shifts the processing to step S15d. On the other hand, in a case where it is determined that the bands corresponding to the 3 wavelengths of λ4 to λ6 are not free in Path 1 (step S15a: No), the path setting unit 11B shifts the processing to step S15b.

In step S15b, the path setting unit 11B determines whether or not bands corresponding to the 3 wavelengths of λ4 to λ6 are free in Path 2. In a case where it is determined that the bands corresponding to the 3 wavelengths of λ4 to λ6 are free in Path 2 (step S15b: Yes), the path setting unit 11B shifts the processing to step S15f. On the other hand, in a case where it is determined that the bands corresponding to the 3 wavelengths of λ4 to λ6 are not free in Path 2 (step S15b: No), the path setting unit 11B shifts the processing to step S15c.

In step S15c, the path setting unit 11B determines whether or not bands corresponding to the 3 wavelengths of λ4 to λ6 are free in Path 1+Path 2. In a case where it is determined that the bands corresponding to the 3 wavelengths of λ4 to λ6 are free in Path 1+Path 2 (step S15c: Yes), the path setting unit 11B shifts the processing to step S15h. On the other hand, in a case where it is determined that the bands corresponding to the 3 wavelengths of λ4 to λ6 are not free in Path 1+Path 2 (step S15c: No), the path setting unit 11B shifts the processing to step S20a. In step S20a, it is difficult for the path setting unit 11B to set bands of the respective sub carriers of λ4 to λ6 of the super channel in Path 1 or Path 2, and it is determined that transmission is difficult to perform. If the processing operation in step S20a finishes, the path setting unit 11B shifts the processing to step S21.

In step S15d, the path setting unit 11B converts, to the bands corresponding to 3 wavelengths free in Path 1, a wavelength that is desired to be wavelength-converted and that is included in λ4 to λ6. Since, at this time, a shift amount of wavelength conversion is optimized so as to be minimized, it is possible to swiftly perform the processing for the wavelength conversion. In addition, the path setting unit 11B instructs the node C and the node Z to set the bands corresponding to 3 wavelengths free in Path 1 as the bands of the respective sub carriers of the super channel. Next, in Path 1, the path setting unit 11B sets respective bands of wavelengths converted in step S15d, as the bands of the respective sub carriers corresponding to 3 wavelengths of the super channel (step S15e). If the processing operation in step S15e finishes, the path setting unit 11B shifts the processing to step S21.

On the other hand, in step S15f, the path setting unit 11B converts, to the bands corresponding to 3 wavelengths free in Path 2, a wavelength that is desired to be wavelength-converted and that is included in λ4 to λ6. Since, at this time, a shift amount of wavelength conversion is optimized so as to be minimized, it is possible to swiftly perform the processing for the wavelength conversion. In addition, the path setting unit 11B instructs the node C and the node Z to set the bands corresponding to 3 wavelengths free in Path 2 as the bands of the respective sub carriers of the super channel. Next, in Path 2, the path setting unit 11B sets respective bands of wavelengths converted in step S15f, as the bands of the respective sub carriers corresponding to 3 wavelengths of the super channel (step S15g). If the processing operation in step S15g finishes, the path setting unit 11B shifts the processing to step S21.

On the other hand, in step S15h, the path setting unit 11B divides the bands of the 3 wavelengths of λ4 to λ6 so that each of the bands of the 3 wavelengths of λ4 to λ6 is sorted into Path 1 or Path 2. Next, the path setting unit 11B converts the wavelength of each of the bands divided in step S15h so that the relevant bands are settable in respective free bands in Path 1 or Path 2 (step S15i). Since, at this time, a shift amount of wavelength conversion is optimized so as to be minimized, it is possible to swiftly perform the processing for the wavelength conversion. In addition, the path setting unit 11B instructs the node C and the node Z to set respective bands of wavelengths converted in step S15i, as the bands of the respective sub carriers of λ4 to λ6 of the super channel (step S15*j*), in Path 1 or Path 2. If the processing operation in step S15*j* finishes, the path setting unit 11B shifts the processing to step S21.

In step S21, in a case where the processing shifts from one of steps S17 to S19, S15*e*, S15*g*, and S15*j*, the path information notification unit 12B in the NMS 10B notifies the node C and the node Z of a transmission distance and a fiber type of a transmission path of each of the sub carriers. In addition, in step S21, in a case where the processing shifts from S20*a*, the path information notification unit 12B notifies the node C and the node Z that transmission is difficult to perform. If the processing operation in step S21 finishes, the path setting processing according to the second embodiment is terminated.

Outline of Processing for Path Setting According to Second Embodiment

Figure 11A:
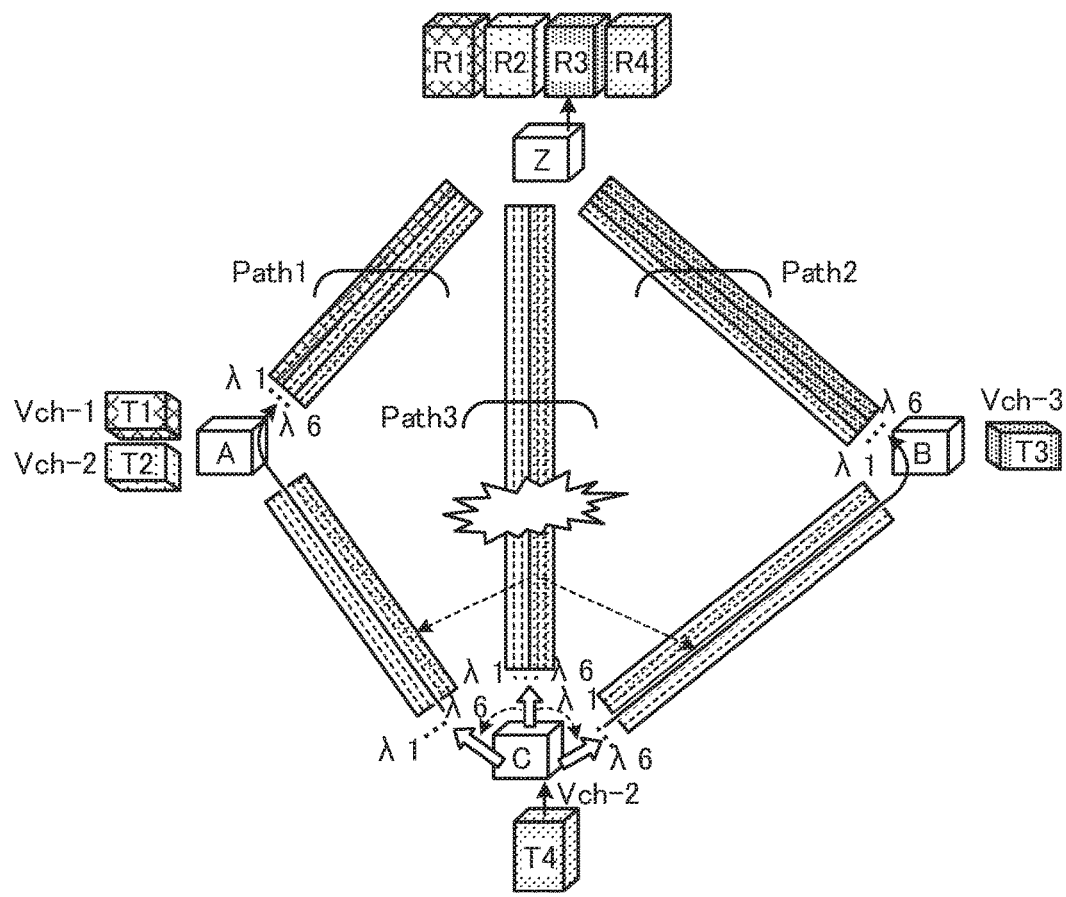
FIG. 11A is a diagram illustrating an example of an outline of the processing for a path setting according to the second embodiment.
Figure 11B:
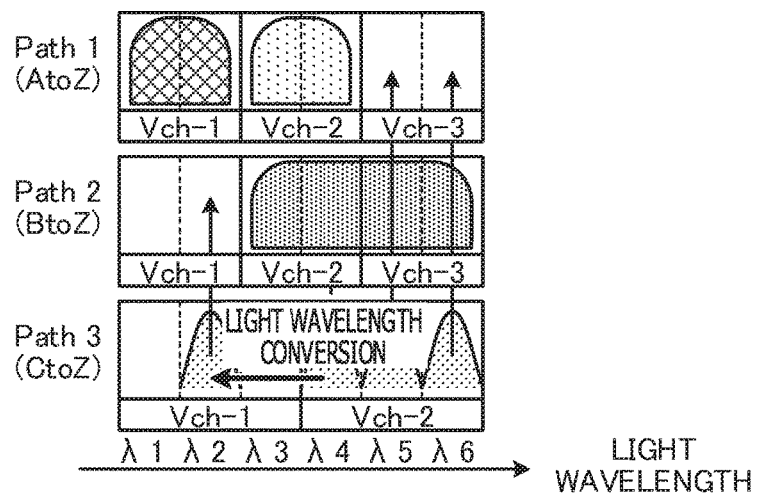
FIG. 11B is a diagram illustrating an example of an outline of the processing for a path setting according to the second embodiment.

FIG. 11A and FIG. 11B are diagrams each illustrating an example of an outline of the processing for a path setting according to the second embodiment. FIG. 11A and FIG. 11B illustrate a case where step S15*a*, S15*b*, S15*c*, S15*h*, S15*i*, and S15*j* are performed in the processing for a path setting according to the second embodiment, illustrated in FIG. 10.

It is assumed that, as illustrated in FIG. 11A and FIG. 11B, in Path 3 in which a super channel whose sub carriers are λ4 to λ6 is set, a transmission path failure occurs. At this time, as illustrated in FIG. 11A, in a section between the node A and the node Z in Path 1, the channel Vch-1 whose band corresponds to the wavelengths λ1 and λ2 is used for communication between the transmitter T1 and the receiver R1. In addition, in the section between the node A and the node Z in Path 1, the channel Vch-2 whose band corresponds to the wavelengths λ3 and λ4 is used for communication between the transmitter T2 and the receiver R2. On the other hand, in the section between the node B and the node Z in Path 2, the channel Vch-2 and channel Vch-3 whose bands correspond to the wavelengths λ3 to λ6 are used for communication between the transmitter T3 and the receiver R3. In such a state, it is assumed that, in the section between the node C and the node Z, a demand occurs which is used for setting, for communication between the transmitter T4 and the receiver R4, an alternative super channel that uses a channel Vch-2 whose band corresponds to the wavelengths λ4 to λ6.

At this time, while, as illustrated in FIG. 11B, the channel Vch-2 requested by the demand uses the bands of the wavelengths λ4 to λ6, each of Path 1 and Path 2 is not in a state in which all the bands of the wavelengths λ4 to λ6 are free (No in step S15 in FIG. 10). However, as illustrated in FIG. 11B, both the bands of wavelengths λ5 and λ6 are free in Path 1, and both the bands of the wavelengths λ1 and λ2 are free in Path 2 (Yes in step S15*c* in FIG. 10).

Therefore, the NMS 10B divides the Vch-2 of the demand into the wavelength λ4 and the wavelengths λ5 and λ6 (step S15*h* in FIG. 10). In addition, the NMS 10B wavelength-converts the wavelength λ4 to the wavelength λ2 (step S15*i* in FIG. 10). Since, at this time, a shift amount of wavelength conversion is optimized so as to be minimized, it is possible to swiftly perform the processing for the wavelength conversion. In addition, the NMS 10B allocates the bands of the wavelengths λ5 and λ6 to the Vch-3 in Path 1 and allocates the band of the wavelength λ2 to a portion of the Vch-1 in Path 2, thereby setting the super channel between the node C and the node Z (step S15*j* in FIG. 10). In this way, in a case where it is difficult to set the transmission path of the super channel in a single Path between the node C and the node Z and there is a band difficult to secure in each of transmission paths, the NMS 10B converts a wavelength of at least one of the sub carriers. In addition, after the wavelength conversion, the NMS 10B allocates the individual sub carriers of the super channel to free bands of individual Paths in a division manner. From this, the second embodiment is able to flexibly set the transmission path of the super channel.

Advantageous Effects of Second Embodiment

In the second embodiment, a sub carrier of a wavelength whose free band does not exist is wavelength-converted to a wavelength of a settable free band of Path and set. Therefore, it is possible to flexibly set, for example, a path of the super channel. In addition, in the second embodiment, since a shift amount of wavelength conversion is optimized so as to be minimized, it is possible to swiftly perform, for example, the processing for the wavelength conversion, and it is possible to flexibly set a path of the super channel even if a sub carrier of a wavelength whose free band does not exist exists.

Third Embodiment

Configuration of Optical Transmission System According to Third Embodiment

In the above-mentioned first and second embodiments, it is assumed that functions of optical delay calculation and delay compensation are included in a receiving-side optical transmission device. However, without limitation to this, as illustrated in a third embodiment, the functions of optical delay calculation and delay compensation may be included in a transmitting-side optical transmission device.

Figure 12:
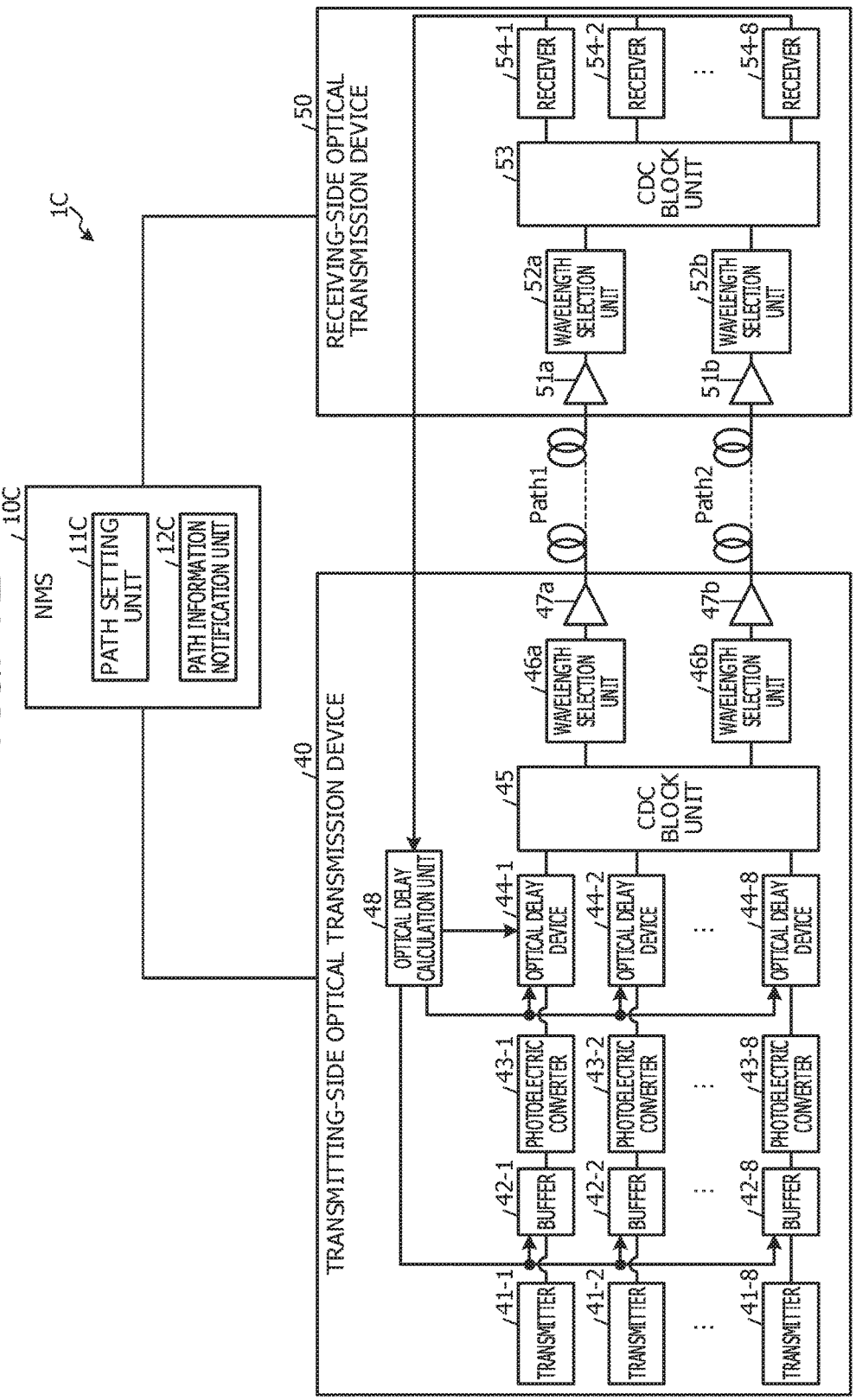
FIG. 12 is a diagram illustrating an example of a configuration of an optical transmission system according to a third embodiment.
Figure 13A:
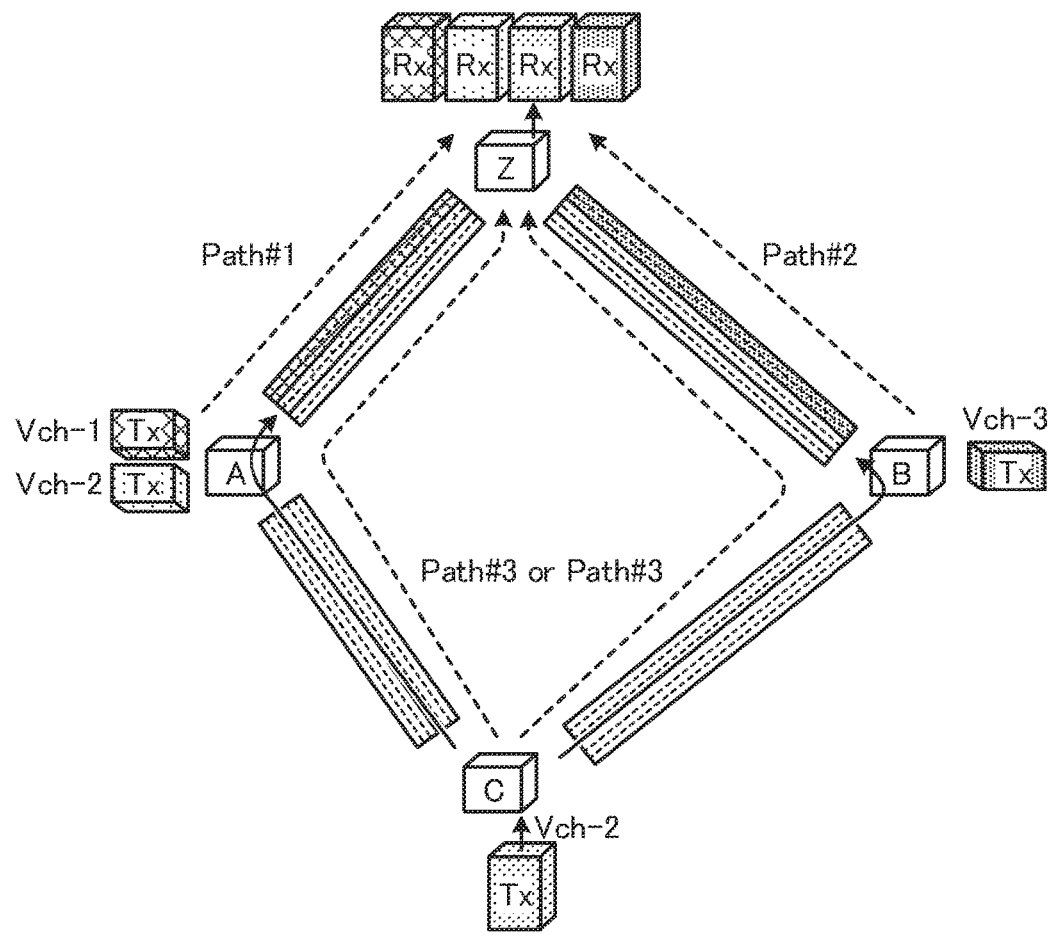
FIG. 13A is a diagram illustrating an example of an outline of processing for a path setting according to the related art.
Figure 13B:
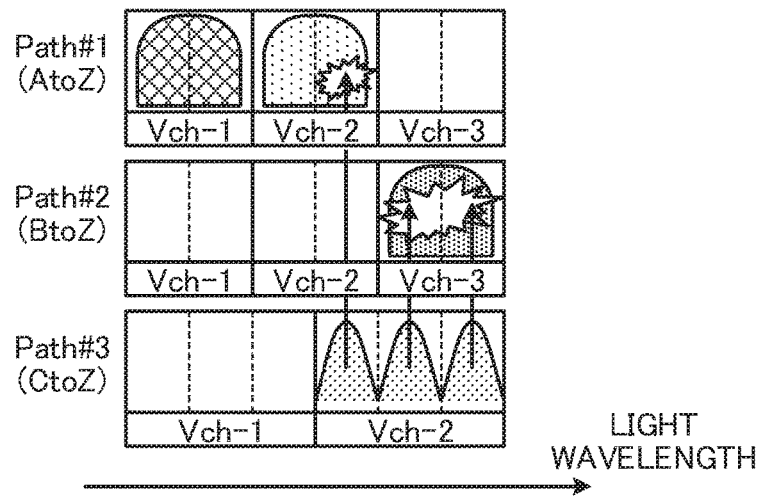
FIG. 13B is a diagram illustrating an example of an outline of the processing for a path setting according to the related art.

FIG. 12 is a diagram illustrating an example of a configuration of an optical transmission system according to the third embodiment. An optical transmission system 1C according to the third embodiment includes an NMS 10C, a transmitting-side optical transmission device 40, and a receiving-side optical transmission device 50. The NMS 10C includes a path setting unit 11C and a path information notification unit 12*c*. The transmitting-side optical transmission device 40 and the receiving-side optical transmission device 50 are coupled to each other by Path 1 and Path 2 set in an optical transmission path. In addition, the NMS 10C is coupled so as to be communicatable with the transmitting-side optical transmission device 40 and the receiving-side optical transmission device 50.

The transmitting-side optical transmission device 40 includes transmitters 41-1 to 41-8, buffers 42-1 to 42-8, electrical-optical converters 43-1 to 43-8, optical delay devices 44-1 to 44-8, a CDC block unit 45, wavelength selection units 46*a* and 46*b*, amplifiers 47*a* and 47*b*, and an optical delay calculation unit 48. Note that the number of the transmitters 41-1 to 41-8, the number of the buffers 42-1 to 42-8, the number of the electrical-optical converters 43-1 to 43-8, the number of the optical delay devices 44-1 to 44-8, the number of the wavelength selection units 46*a* and 46*b*, or the number of the amplifiers 47*a* and 47*b* is not limited to the number illustrated in FIG. 12.

The transmitters 41-1 to 41-8 input, to the buffers 42-1 to 42-8, respectively, electric signals output by a terminal, not illustrated. In accordance with an instruction from the optical delay calculation unit 48, the buffers 42-1 to 42-8 delay the respective input electric signals corresponding to respective sub carriers, thereby performing delay compensation so that respective delay amounts become equal to one another. The buffers 42-1 to 42-8 input, to the corresponding electrical-optical converters 43-1 to 43-8, respectively, the respective delayed electric signals corresponding to the respective sub carriers. The electrical-optical converters 43-1 to 43-8 input, to the corresponding optical delay devices 44-1 to 44-8, respectively, optical signals obtained by electrical-optical converting the input electric signals.

Based on delay information or the like based on transmission distances given notice of by the optical delay calculation unit 48, the optical delay devices 44-1 to 44-8 optically delay the respective optical signals that correspond to the respective sub carriers and that are input by the electrical-optical converters 43-1 to 43-8, respectively, thereby performing optical delay compensation thereon so that individual delay amounts become equal to one another. The optical delay devices 44-1 to 44-8 input, to the CDC block unit 45, the individual optical signals that correspond to the respective sub carriers and that are subjected to the optical delay compensation.

The CDC block unit 45 inputs the optical signals output by the respective optical delay devices 44-1 to 44-8 to the wavelength selection units 46a and 46b that correspond to directional paths serving as Paths specified by path setting information given notice of by the NMS 10C.

The wavelength selection unit 46a is a switch that selects, from among wavelength components of the optical signals input by the CDC block unit 45, wavelength components that coincide with bands used in Path 1 and specified by the path setting information given notice of by the NMS 10C and inputs the wavelength components to the amplifier 47a. The wavelength selection unit 46b is a switch that selects, from among wavelength components of the optical signals input by the CDC block unit 45, wavelength components that coincide with bands used in Path 2 and specified by the path setting information given notice of by the NMS 10C and inputs the wavelength components to the amplifier 47b. The amplifiers 47a and 47b amplify and output optical signals of input wavelength components to the Path 1 and the Path 2, respectively.

The optical delay calculation unit 48 monitors residual dispersions of the respective sub carriers based on pieces of delay information that are caused by wavelength differences between the individual electric signals corresponding to the respective sub carriers and that are given notice of by respective receivers 54-1 to 54-8 in the receiving-side optical transmission device 50, described later, and accordingly the optical delay calculation unit 48 obtains delay differences from the residual dispersions. In addition, at the time of calculating the delay differences, the optical delay calculation unit 48 uses transmission distances and fiber types of transmission paths of the respective sub carriers, given notice of by the NMS 10C.

The receiving-side optical transmission device 50 includes amplifiers 51a and 51b, wavelength selection units 52a and 52b, a CDC block unit 53, and receivers 54-1 to 54-8. The amplifiers 51a and 51b amplify and input optical signals, received via the respective Path 1 and Path 2, to the wavelength selection units 52a and 52b, respectively.

The wavelength selection unit 52a is a switch that selects, from among wavelength components of the optical signal input by the amplifier 51a, wavelength components that coincide with bands used in Path 1 and specified by the path setting information given notice of by the NMS 10C and inputs the wavelength components to the CDC block unit 53. The wavelength selection unit 52b is a switch that selects, from among wavelength components of the optical signal input by the amplifier 51b, wavelength components that coincide with bands used in Path 2 and specified by the path setting information given notice of by the NMS 10C and inputs the wavelength components to the CDC block unit 53.

The CDC block unit 53 has the same function as that of the CDC block unit 45. The CDC block unit 53 inputs the optical signal input by the wavelength selection unit 52a to the receivers 54-1 to 54-8 that correspond to respective directional paths serving as Paths specified by the path setting information given notice of by the NMS 10C. The receivers 54-1 to 54-8 detect delays caused by wavelength differences between the respective input electric signals corresponding to the respective sub carriers and notify the optical delay calculation unit 48 in the transmitting-side optical transmission device 40 thereof.

Advantageous Effects of Third Embodiment

In the third embodiment, the functions of the optical delay calculation and the delay compensation are included in the transmitting-side optical transmission device, thereby transmitting signals after preliminarily performing delay compensation thereon before the transmission. Therefore, in the third embodiment, even in a case of signals of the super channel, which are received via, for example, transmission paths whose sub channels are different, no signal delay between the sub carriers occurs in the receiving-side transmission device. Therefore, it is possible to swiftly decode signals.

According to the above-mentioned first to third embodiments, it is possible to set sub carriers, included in a super channel, not in the same transmission path but in transmission paths different from one sub carrier to another. In the first to third embodiments, delay compensation for signals of respective sub carriers is performed based on, for example, distances of respective transmission paths along which the respective sub carriers travel. In wavelength division multiplex (WDM) in which, for example, different signals are just multiplexed and transmitted, even in a case where a signal of one wavelength is transmitted using a different transmission path, being basically different signals allows delay compensation not to be performed. However, in the super channel in which sub carriers are highly densely multiplexed to one signal and transmitted, if differences between transmission paths along which the respective sub carriers travel cause delays, the delays lead to deterioration of transmission performance of high density multiplexing serving the purpose of the super channel. Therefore, by performing delay compensation, based on the distances of the respective transmission paths along which the sub carriers travel, it is possible for the super channel to avoid the deterioration of transmission performance and to flexibly configure a network including the super channel.

Individual configuration elements in each of devices illustrated in the above-mentioned first to third embodiments do not have to be configured as illustrated in drawings. In other words, a specific embodiment of the distribution and/or integration of the individual units is not limited to one of examples illustrated in drawings, and all or part of the individual units may be functionally or physically integrated or distributed in arbitrary units according to various loads and various statuses of use.

In addition, all or arbitrary part of various kinds of processing functions performed in each of devices may be performed on a central processing unit (CPU). Alternatively, all or arbitrary part of various kinds of processing functions performed in each of devices may be performed on a microcomputer such as NP, MPU, MCU, ASIC, or FPGA. Here, NP is a network processor, MPU is a micro processing unit, MCU is a micro controller unit, ASIC is an application specific integrated circuit, and FPGA is a field-programmable gate array. In addition, all or part of various kinds of processing functions may be performed on a program, analyzed and executed by a CPU (or a microcomputer such as MPU or MCU), or on hardware based on hard-wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission system comprising:
    a first transmission path and a second transmission path that couple optical transmission devices to each other; and
    a management circuit that manages the optical transmission devices,
    wherein when the management circuit sets a super channel including a first sub carrier and a second sub carrier between the optical transmission devices, the management circuit determines whether bands corresponding to respective wavelengths of the first sub carrier and the second sub carrier are free in the first transmission path or the second transmission path,
    wherein the management circuit allocates the first sub carrier and the second sub carrier to the first transmission path when the management circuit determines that the bands corresponding to the respective wavelengths of the first sub carrier and the second sub carrier are free in the first transmission path,
    wherein the management circuit allocates the first sub carrier to the first transmission path and allocates the second sub carrier to the second transmission path when the management circuit determines that a band corresponding to the wavelength of the first sub carrier is free in the first transmission path and a band corresponding to the wavelength of the second sub carrier is free in the second transmission path.

2. The optical transmission system according to claim 1, wherein at least one of the optical transmission devices includes a receiving-side optical transmission device which includes
    a first receiver that receives a first optical signal transmitted by the first sub carrier included in the super channel,
    a second receiver that receives a second optical signal transmitted by the second sub carrier included in the super channel, and
    an optical delay circuit that delays the first optical signal, based on path lengths of respective transmission paths along which the first optical signal and the second optical signal are transmitted.

3. The optical transmission system according to claim 1, wherein
    the management circuit converts the wavelength of the first sub carrier to a wavelength corresponding to a band free in the first transmission path or the second transmission path when the management device determines that the band corresponding to the wavelength of the first sub carrier is not free in the first transmission path or the second transmission path, and
    the first sub carrier is allocated to the first transmission path or the second transmission path, in which the band corresponding to the converted wavelength, is free.

4. The optical transmission system according to claim 2, wherein the receiving-side optical transmission device further includes
    a buffer that delays, based on the path lengths, a first electric signal corresponding to the first optical signal with respect to a second electric signal corresponding to the second optical signal.

5. The optical transmission system according to claim 3, wherein at least one of the optical transmission devices includes
    a first receiver that receives a first optical signal transmitted by the first sub carrier,
    a second receiver that receives a second optical signal transmitted by the second sub carrier, and
    an optical delay circuit that delays the first optical signal and an electric signal corresponding to the first optical signal, based on path lengths of respective transmission paths along which the first optical signal and the second optical signal are transmitted.

* * * * *